United States Patent
Saenz et al.

(10) Patent No.: US 11,281,955 B2
(45) Date of Patent: Mar. 22, 2022

(54) SYSTEM AND METHOD FOR PROGRAMMING WIRELESS SENSOR TAGS IN FOOD SERVICE OPERATIONS

(71) Applicant: METRC, LLC, Lakeland, FL (US)

(72) Inventors: Jorge Saenz, Weston, FL (US); Dilek Dagdelen Uysal, Lakeland, FL (US); Dennis Jump, Denton, TX (US); Ozcan Yurt, Lakeland, FL (US); Jaime Munera, Sunrise, FL (US); Jeffrey Lane Wells, Lakeland, FL (US)

(73) Assignee: METRC LLC, Lakeland, FL (US)

( * ) Notice: Subject to any disclaimer, the term of this patent is extended or adjusted under 35 U.S.C. 154(b) by 0 days.

(21) Appl. No.: 16/768,678

(22) PCT Filed: Dec. 3, 2018

(86) PCT No.: PCT/US2018/063655
§ 371 (c)(1),
(2) Date: May 31, 2020

(87) PCT Pub. No.: WO2019/109087
PCT Pub. Date: Jun. 6, 2019

(65) Prior Publication Data
US 2021/0192305 A1 Jun. 24, 2021

Related U.S. Application Data

(60) Provisional application No. 62/593,638, filed on Dec. 1, 2017.

(51) Int. Cl.
*G06K 19/07* (2006.01)
*G06Q 10/08* (2012.01)

(52) U.S. Cl.
CPC ..... *G06K 19/0723* (2013.01); *G06Q 10/0875* (2013.01)

(58) Field of Classification Search
CPC .. G06Q 10/087; G06Q 10/0875; G06K 19/00; G06K 19/04; G06K 19/06
(Continued)

(56) References Cited

U.S. PATENT DOCUMENTS 6,982,640 B2   1/2006  Lindsay et al.
7,796,038 B2   9/2010  Batra
(Continued)

FOREIGN PATENT DOCUMENTS

WO   2016/019417 A1   8/2015

OTHER PUBLICATIONS

Bibi, Fabien et al. "A review: RFID technology having sensing aptitudes for food industry and their contribution to tracking and monitoring of food products," Trends in Food Science & Technology 62:91-103, 2017.
(Continued)

*Primary Examiner* — Edwyn Labaze
(74) *Attorney, Agent, or Firm* — Saliwanchik, Lloyd & Eisenschenk

(57) ABSTRACT

Embodiments of the invention relate to a method and system for programming wireless sensor tags, and such programmed wireless sensor tags. Embodiments of the method and apparatus can be utilized in food service operations, without utilizing a computing device or smartphone for programming the wireless sensor tag. Embodiments relate to a method and system for programming wireless temperature sensor tags, and such programmed wireless temperature sensor tags. Embodiments of the subject method use NFC-enabled cards with Near Field Communications (NFC) technology to quickly and simply program a wireless temperature sensor tag to read, collect, and report the temperature of a food item or ingredient. The use of this method enables food service operators, such as: quick-serve restau-
(Continued)

rants (QSRs), school cafeterias, and food service departments within supermarkets, to simplify the collection of temperature data within the retail space, as well as throughout the supply chain of products. The present invention also uses a display and at least one button on the wireless sensor tag for programming the wireless sensor tag.

32 Claims, 6 Drawing Sheets

(58) Field of Classification Search
USPC .......................... 235/385, 375, 487; 705/417
See application file for complete search history.

(56) References Cited

U.S. PATENT DOCUMENTS

| | | | |
|---|---|---|---|
| 2006/0238309 A1* | 10/2006 | Takatama | G06K 19/0723 340/10.41 |
| 2010/0052909 A1 | 3/2010 | Doan et al. | |
| 2011/0025461 A1* | 2/2011 | Nobutsugu | G07G 1/009 340/5.92 |
| 2012/0169585 A1* | 7/2012 | Kim | G08B 5/36 345/156 |
| 2013/0214938 A1 | 8/2013 | Kim et al. | |
| 2014/0149079 A1 | 5/2014 | Shin et al. | |
| 2016/0104440 A1* | 4/2016 | Lee | G06F 1/3265 345/212 |
| 2017/0301273 A1* | 10/2017 | Atkinson | G06F 3/0421 |
| 2018/0276690 A1* | 9/2018 | Sequeira | G08B 13/2417 |
| 2020/0005683 A1* | 1/2020 | Guan | H04W 4/35 |
| 2020/0149797 A1* | 5/2020 | Yamahira | F25D 11/00 |

OTHER PUBLICATIONS

LOGUSGD: "Preparing Log-ic 360TM USB Loggers for Use."
TEGAM—Industrial Data Thermometer "Prices and specifications subject to change without notice."
Volpentesta, Antonio et al. "Intelleigent Food Information Provision to Consumers in an Internet of Food Era," submitted Jan. 3, 2018.
Supplementary European Search Report and European Search Opinion issued in a parallel European Application No. 18 883 182.0, dated Sep. 29, 2021.

* cited by examiner

SYSTEM AND METHOD FOR PROGRAMMING WIRELESS SENSOR TAGS IN FOOD SERVICE OPERATIONS

CROSS REFERENCE TO RELATED APPLICATIONS

This application is a National Stage Application of International Application Number PCT/US2018/063655, filed Dec. 3, 2018; which claims the benefit of U.S. Provisional Application Ser. No. 62/593,638, filed Dec. 1, 2017, both of which are incorporated herein by reference in its their entirety.

FIELD OF INVENTION

Embodiments of the present invention relate to a system and methods for programming wireless sensor tags, such as temperature and/or humidity tags, and related programmed wireless sensor tags and systems incorporating such programmed wireless sensor tags. Embodiments relate to a method of incorporating such programmed wireless sensor tags in a method and system for use in Food Service Operations. A particular embodiment of the invention relates to a system and methods for programming wireless temperature sensor tags according to a food item or ingredient type, a stock keeping unit (SKU), and/or a menu item in food service operations, where the use of a computing device, such as a smartphone or tablet, is restricted or unavailable.

BACKGROUND OF INVENTION

Food service operations, such as: quick-serve and fast-casual restaurants, food service departments within supermarkets, school cafeterias, hospital's cafeterias, patient meal services, and food deliveries (including pre-cooked and uncooked meal kit deliveries), are required to constantly monitor the temperature of foods and ingredients, in order to minimize food safety risks and assure the integrity and wholesomeness of the food served to customers.

Many food service operators utilize manual, or partially manual, processes to measure and collect the temperature of foods and ingredients. These manual processes may include the use of standalone analog and digital thermometers, and/or the use of paper-logs or electronic devices capable of measuring and/or storing temperature data. However, manual processes are generally time consuming and are susceptible to human errors.

Partially, or fully, automated methods for measuring and collecting product temperature data are now available. Some methods utilize wired temperature sensors placed on or inside food service equipment, such as coolers, freezers, prep tables, food storage containers, and food holding containers. However, these automated methods typically only provide an approximation of the temperature of the food since the actual sensor is not in direct contact with the food.

Other partially, or fully, automated methods may utilize wireless temperature sensor tags, which may be placed in direct contact with food or ingredients. These wireless temperature sensor tags are typically pre-programmed with a specific configuration, and measure the temperature of a particular food item or ingredient, based on the setting, and association of the temperature measurement to the particular food item or ingredient is typically done manually. One method of programming the wireless temperature sensor tag utilizes an interrogator to communicate with the tag, such as a portable computer or a handheld electronic programming/reading device together with the programming software resident in the computer or handheld device. Another method of programming the wireless temperature sensor tag uses a smartphone or tablet together with a mobile app. Depending on the number of food items, and/or the number of ingredients, used by the food service operators, these methods of programming the wireless temperature sensor tag can be challenging and time consuming. Programming the wireless temperature sensor tag is increasingly difficult if programming of the wireless temperature sensor tags needs to be done at restaurants or stores.

Wireless temperature sensor tags may also be pre-programmed at the factory, e.g., customized for a particular food item or ingredient, if the food item or ingredient is pre-defined, which can reduce the challenges of performing these programming tasks in the field or at retail restaurants or stores. However, inventory management of customized wireless temperature sensor tags may create other challenges, such as logistic and inventory management issues, for the food service operators. Moreover, in situations with multiple wireless temperature sensor tags, without any physical indications (e.g., visual) on the tags, the user may still not know which tags need to be placed in which containers without communicating with the tags in some fashion. Further, in some cases, pre-programming and labeling the wireless temperature sensor tags is not possible, or feasible, due to the repetitive changing of food or ingredients that are served.

Furthermore, the use of computing or handheld electronic devices, or even smartphones, in restaurants and stores may be limited, restricted, or unavailable. One reason that such devices may be limited, restricted, or unavailable is the extra cost of these devices especially to owners of multiple restaurants or stores. Although many, or most, employees may carry a personal smartphone capable of using a mobile app to program the wireless temperature sensor tags, the employees may object to using their personal devices for such purposes, or the use of personal devices by employees may not be approved by, or desirable to, the employer.

The limitations mentioned above illustrate the need in the food service industry for a novel and useful method for programming wireless sensor tags, e.g., wireless temperature sensor tags, and identifying which food item or ingredient the tag is programmed for (also pairing, matching, associating, and/or coupling such tags with a food item or ingredient), in a restaurant, store, cafeteria, sports venue, or other food service operations, including food deliveries, without utilizing a computing device, smartphone, tablet, or other handheld electronic device.

BRIEF SUMMARY

Embodiments of the invention relate to a method and system for programming wireless sensor tags ("sensor tags"), which measure, collect, and transmit the sensor data, such as temperature, and/or humidity, and such programmed wireless sensor tags. Embodiments relate to a method of incorporating such programmed tags to measure, collect, and transmit temperature of foods and ingredients in food service operations, and such tags. Embodiments of the method include programming a wireless sensor tag via a display and one or more buttons controlled by a processor on the tag by just entering a number associated with the product or the configuration. Embodiments of the method include programming a wireless sensor tag and utilizing a passive device, such as a card, sticker, or fob containing the programming parameters for a particular food item or ingredient, that is associated with the tag, and may be used to identify or mark the tag. In specific embodiments, both the wireless sensor tag and the passive device include structures to implement magnetic field induction, and/or transmission and/or receipt of electromagnetic fields, to allow contactless communication between the wireless sensor tag and the passive device.

Specific embodiments include a wireless sensor tag that has: a low power consuming display, such as an electronic paper (e-paper) display, a bi-stable liquid crystal display (LCD), or a reflective LCD display; and at least one button, where the display and button(s) are connected to a processor. The display and the button(s) are used for programming the wireless sensor tag based on a food ingredient list, product type list, a stock keeping unit (SKU), or other characteristic or parameter list by entering a corresponding number or other identifier. Each food item or ingredient utilized by a particular food service operation will be associated with a number, or other identifier, that identifies one or more parameters, such as food category or ingredient category, food name or ingredient name, or stock keeping unit (SKU) number. The corresponding number can also identify parameters related to the configuration of the tag, such as minimum and maximum temperatures (low and high temperature thresholds), exposure interval of low and high temperatures, reading frequency (interval), event triggers such as battery, and wireless communication settings. This number or other identifier can be displayed on the tag's alphanumeric display via pressing one or more buttons on a tag in a certain manner, such as in a certain order, a certain combination, a certain time period, and/or other metric to distinguish from other numbers or identifiers. When the tag is placed in operating position, such as inside the product, and started, the tag measures the sensory data or readings, such as measuring the temperature of the product and sends this sensory information, along with the number entered in the display, based on the configuration programmed in the tag.

Another embodiment can use a communication protocol standard, referred to as Near Field Communications or "NFC," for programming the tag, where NFC utilizes electromagnetic field induction between two loop antennas.

In one embodiment, the wireless temperature sensor tag acts as an active NFC-enabled device that can interrogate NFC tags, while the associated NFC-enabled card, sticker, sheets, or fob acts as a passive NFC-enabled device housing the NFC tag. In another embodiment, the wireless temperature sensor tag incorporates passive NFC components, such as an NFC tag, while the NFC-enabled card, sticker, sheet, or fob acts as an interrogator with active NFC components.

Embodiments of the method include the use of NFC-enabled cards, pre-programmed with a number, where the number corresponds to one or more parameters, such as food item, ingredient, food category or ingredient category, food name or ingredient name, and/or stock keeping unit (SKU) number, and can also correspond to parameters related to the configuration of the tag, such as maximum and minimum temperatures, reading frequency, and event triggers, associated to each food item, ingredient, food category, ingredient category, food name, or ingredient name, the temperature (or other property) of which is being monitored, e.g., continuously monitored in the restaurant, store, or other food service operation.

Embodiments provide multiple NFC-enabled cards for a corresponding multiple of food items or ingredients utilized by a particular food service operation. Such food service operations include, but are not limited to a quick-serve or fast casual restaurant, a food service department within a supermarket, a school cafeteria, and a hospital's meal service department. These NFC-enabled cards can be preprogrammed as a sheet, where each sheet contains multiple NFC-enabled sections corresponding to multiple food items or ingredients and each NFC-enabled section associated with a food item or ingredient has its own NFC components. In an embodiment, each of multiple sheets is an interrogator, and the NFC-enabled card can have multiple readers, where each reader chip can control multiple food items, where each food item is associated with an antenna of a corresponding multiple antennas.

In an embodiment, the wireless temperature sensor tag can be easily programmed by the NFC-enabled card, when the NFC-enabled card is in close proximity, to allow the tags to measure, collect, and transmit the temperature of a food item or ingredient, without requiring a computing or handheld device, a smartphone, or a tablet for programming the sensor tags.

In an embodiment, NFC-enabled cards, stickers, or fobs containing the programming parameters can be attached or bundled with the sensor tag so that the sensor tag will have a visual aid to confirm the product the sensor tag is associated with, which can assist in making sure the sensor tag is in, or proximate, the product the sensor tag is associated with.

Another embodiment includes a sensor tag that can be programmed with a NFC-enabled card, where the sensor tag has a display as a visual aid to show the programmed number, and/or other identifier, to help the user to confirm what product the sensor tag is associated with.

BRIEF DESCRIPTION OF DRAWINGS

Embodiments of the present invention are illustrated as an example and are not limited by the figures of the accompanying drawings, in which like references may indicate similar elements and in which.

DETAILED DISCLOSURE

Figure 1:
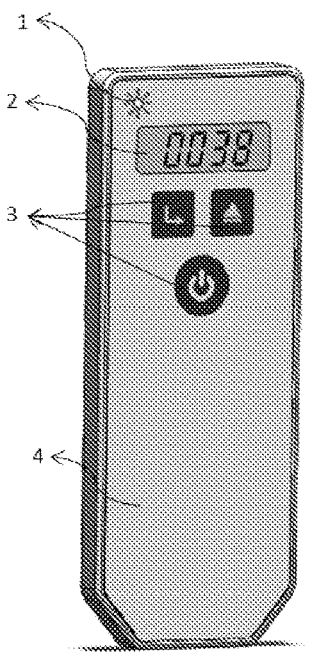
FIG. 1 illustrates a wireless sensor tag with a display, and at least one button used for programming the sensor tag to be associated with one or more parameters, such as a food item or ingredient in a food service operation.

Food service operations, such as quick-serve restaurants, food service departments within supermarkets, school cafeterias, hospital meal services, and food deliveries (including pre-cooked and uncooked meal kit deliveries), need to monitor, and preferably continuously monitor, the temperature of one or more food products that are incorporated into, or are themselves, the food items and ingredients that are served to consumers, in order to avoid, or reduce, food safety risks. However, measuring, collecting, and analyzing such temperature data is a challenge.

Analog, digital, and infrared thermometers have been, and continue to be, used for measuring the temperature of food products, with accompanying manual temperature data collection. Wired or wireless temperature loggers are often used instead of thermometers because of their logging capabilities, which increase the productivity of the people responsible for collecting the temperature data. Specific wireless temperature loggers not only measure and collect temperature, but also transmit the temperature data to a computer or other data storage devices automatically. To measure and collect the temperature data of food item or ingredient wireless temperature sensor tags need to be configured or programmed prior to use with specific operating parameters related to the food item or ingredient. These wireless temperature sensor tags can be programmed with the host device that the tags are communicating with. However, one of the biggest challenges is that the wireless temperature sensor tag, or the host, does not know which tag is associated with which food item or ingredient, i.e., which food item or ingredient the sensor tag is measuring the temperature of. The user often needs to either: (i) program the wireless temperature sensor using an external computer, handheld programmer/reader, or a mobile device, such as a smart phone or tablet; or (ii) match the pre-programmed and labeled wireless temperature sensor tags with the food item or ingredient. Pre-programming tags is often not practical, or desirable, due to inventory management issues.

The use of handheld programmer/reader and mobile devices in food service operations may create operational and financial challenges. Operational challenges may be associated with either: a) the availability of programming devices in the restaurant or store, b) the knowledge required to operate the hardware or the software, and/or c) the amount of time required to program each food item or ingredient. Financial challenges may be associated with a) the cost of the hardware and software for a multiple restaurants or store operator, b) the cost of implementation and training, and/or c) the cost of replacing and/or upgrading hardware or software.

Embodiments of the subject method and apparatus can be utilized in one or more use case scenarios, as described herein, where the functionality and usefulness of embodiments of the subject method and apparatus are described.

A typical food service operator is a quick-serve restaurant with global footprint and large franchisee-based stores, where the food service operator desires to strengthen the process used for food safety compliance by automating temperature collection of multiple food items or ingredients in each restaurant (e.g., over fifty food ingredients at each restaurant).

In an embodiment, the food service operator can use wireless temperature sensor tags in accordance with an embodiment of the subject invention, in direct contact with food items and/or ingredients, or in sufficient proximity to measure temperatures that accurately reflect the temperature of the food items and/or ingredients being monitored. The sensor tags can be placed inside storage containers in the preparation table, inside the cooler and freezer, inside shipping containers, and/or other appropriate locations.

FIG. 1 shows an embodiment of a wireless sensor tag in accordance with an embodiment of the invention, having an LED 1, a display 2, three buttons 3, and a water proof housing incorporating a food grade material.

Figure 2:
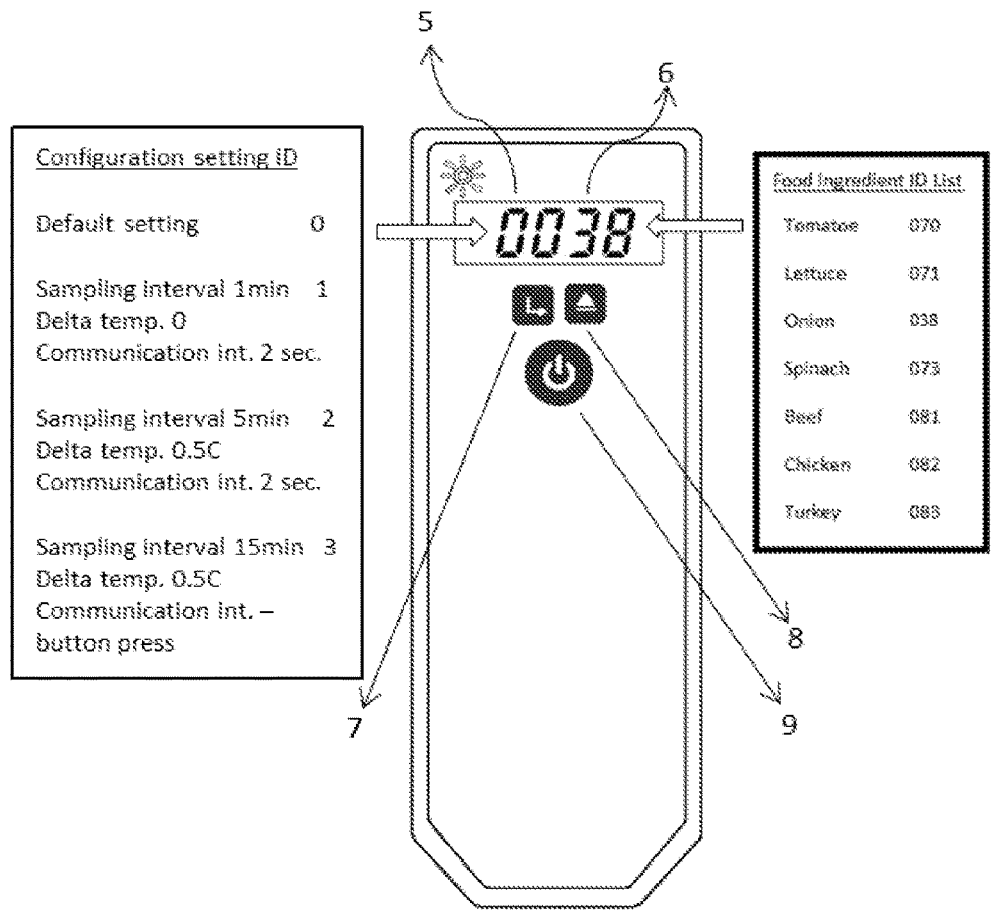
FIG. 2 illustrates a schematic of a wireless sensor tag showing a configuration setting ID and Food Ingredient ID list that can be used in a specific embodiment, where the display shows a number that provides the identification of a food item or ingredient based on a food service operator's food ingredient ID list.

FIG. 2 shows the wireless sensor tag of FIG. 1, showing an identification of a food item or ingredient on the display 2, where the first digit 5 is assigned to the configuration setting ID of the sensor tag 26, and the last 3 digits 6 are assigned to the food ingredient ID corresponding to the food ingredient ID list 35, activation button 7, a number counting button 8, and a turn on/off button.

Figure 3:
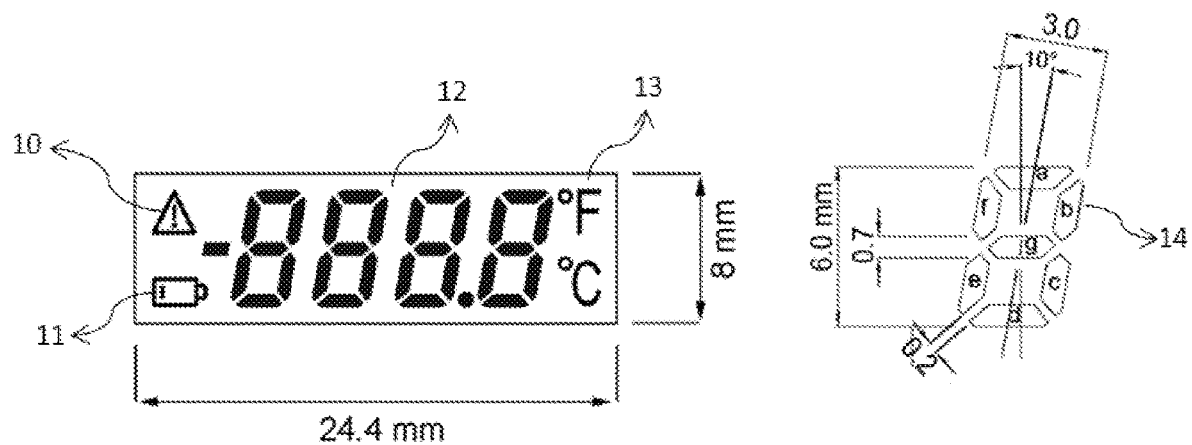
FIG. 3 illustrates a segmented display that can be incorporated with an embodiment of a sensor tag.

FIG. 3 shows a specific embodiment of a display for a wireless sensor tag, which can be used, having an alert signal 10, a low battery indicator 11, digits that can alternately display (i) the product ID (i.e., the configuration setting ID and food ingredient ID); and (ii) the value of the current temperature 12, and a temperature unit indication 13, showing the digit measurements of digits 12.

Figure 4:
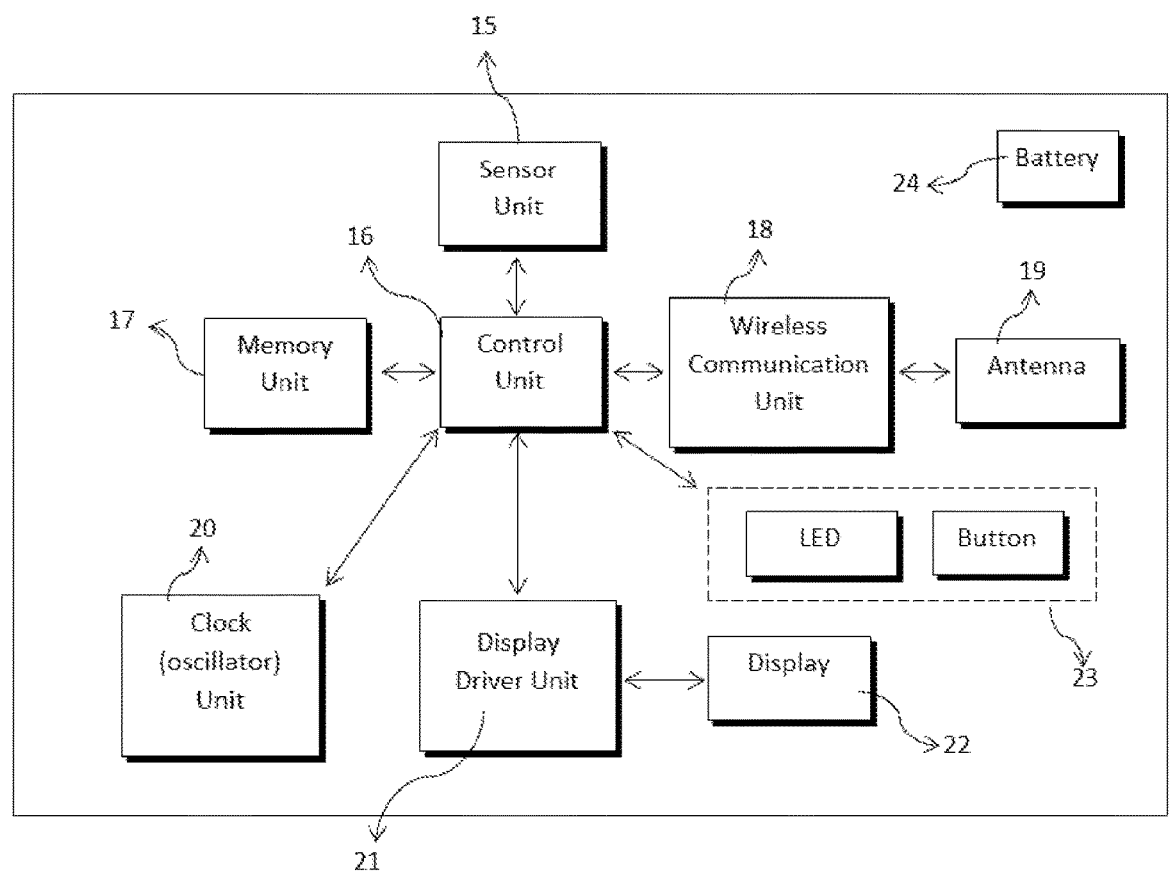
FIG. 4 illustrates a block diagram of an embodiment of a wireless sensor tag.

FIG. 4 shows a block diagram of a wireless sensor tag 26, having sensor unit(s) 15, such as temperature, humidity, and/or light sensor(s), a control unit (such as a microprocessor) 16, a memory unit 17, a wireless communication unit (such as BL, BLE, Wi-Fi, and/or Zigbee) 18, an antenna of the wireless communication unit 19, a clock unit 20, a display driver unit 21, a display (such as a low lower display) 22, user interface components (such as an LED and one or more button(s)) 23, and a battery 24.

Figure 5:
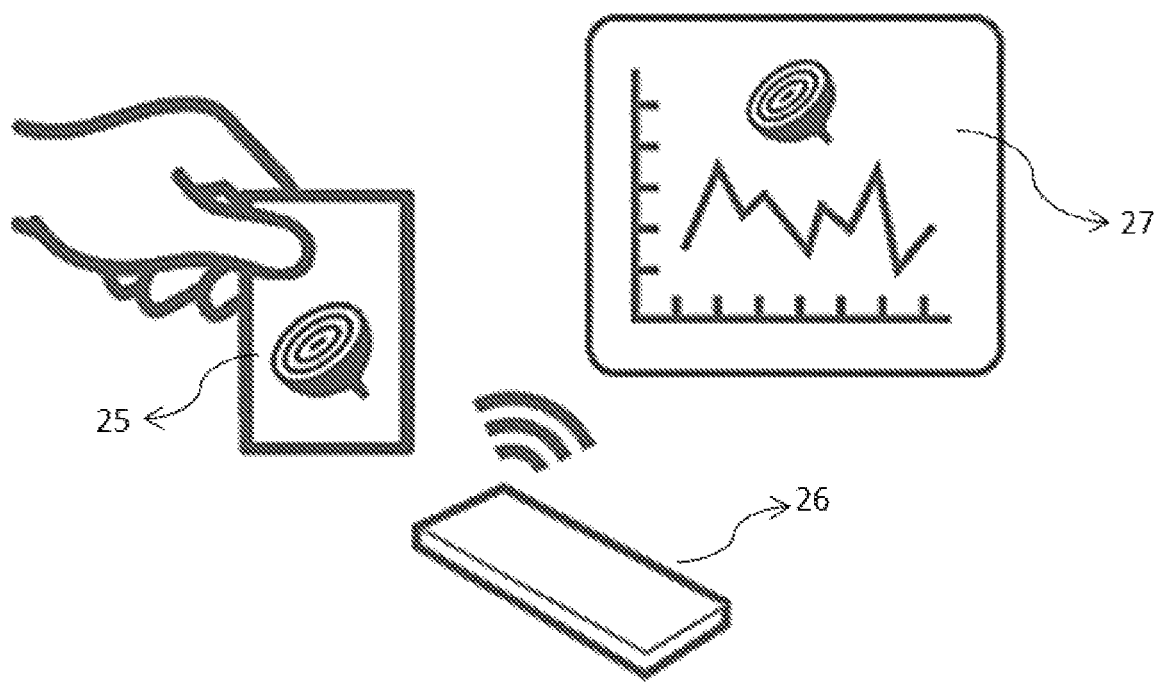
FIG. 5 depicts a wireless temperature sensor tag 26 being programmed by a wireless NFC-enabled card 25 using Near Field Communications (NFC), and a depiction of sensor data 27 carried by a data signal, emitted by the sensor tag 26.

FIG. 5 depicts a wireless temperature sensor tag 26 being programmed by a wireless NFC-enabled card 25 using (NFC) and a depiction of the sensor data 27 provided in a data signal emitted by the sensor tag 26, which can be displayed if desired. The data signal emitted by the sensor tag 26 can be received via a reader 28, such as a computer with a wireless communication unit, and the sensor data can be extracted from the data signal via software and/or hardware.

Figure 6:
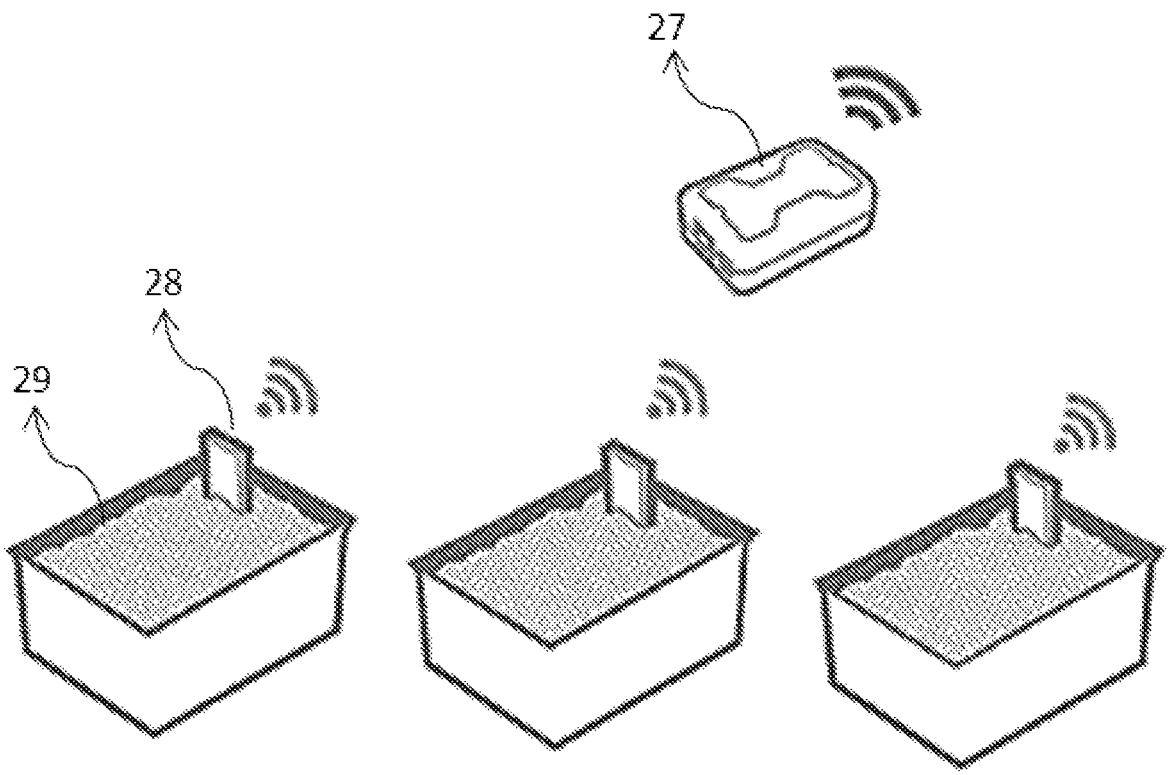
FIG. 6 depicts three programmed wireless temperature sensor tags 26 in direct contact with the corresponding food products 29, such as food items, the temperature of which is being monitored, e.g., continuously monitored.

FIG. 6 depicts three programmed wireless temperature sensor tags 26 in direct contact with the corresponding products to be monitored 29, which are food items the temperature of which is being continuously monitored, and a reader 27 such as a computer with a wireless communication unit, BLE sniffer, or other system, collecting the data.

Figure 7:
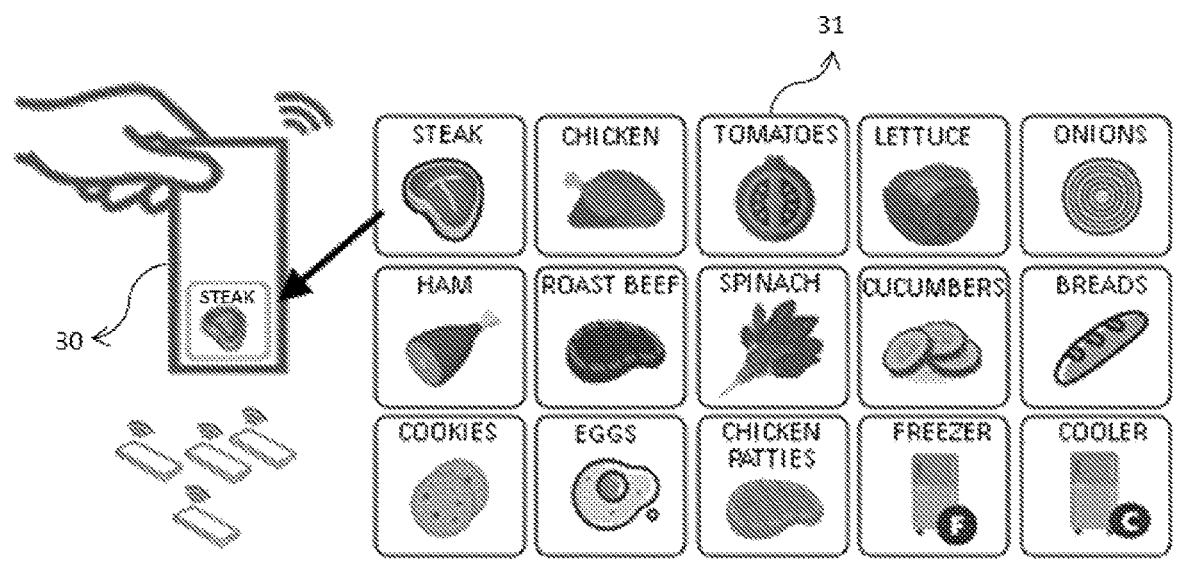
FIG. 7 illustrates a card holder 31 containing NFC-enabled cards 30 corresponding to 15 food products, such as food items or ingredients, or other parameters representative of food products, such as a freezer or cooler where the food products are stored, for use in a food service operation, where the NFC-enabled cards program the sensor tag 26.

FIG. 7 illustrates a card holder 31 containing NFC-enabled stickers 30 that identify 15 food items, ingredients, or other parameters, in a food service operation, where the NFC-enabled stickers can be used for programming the sensor tag by placing the sticker 30 on the sensor tag 26.

Figure 8:
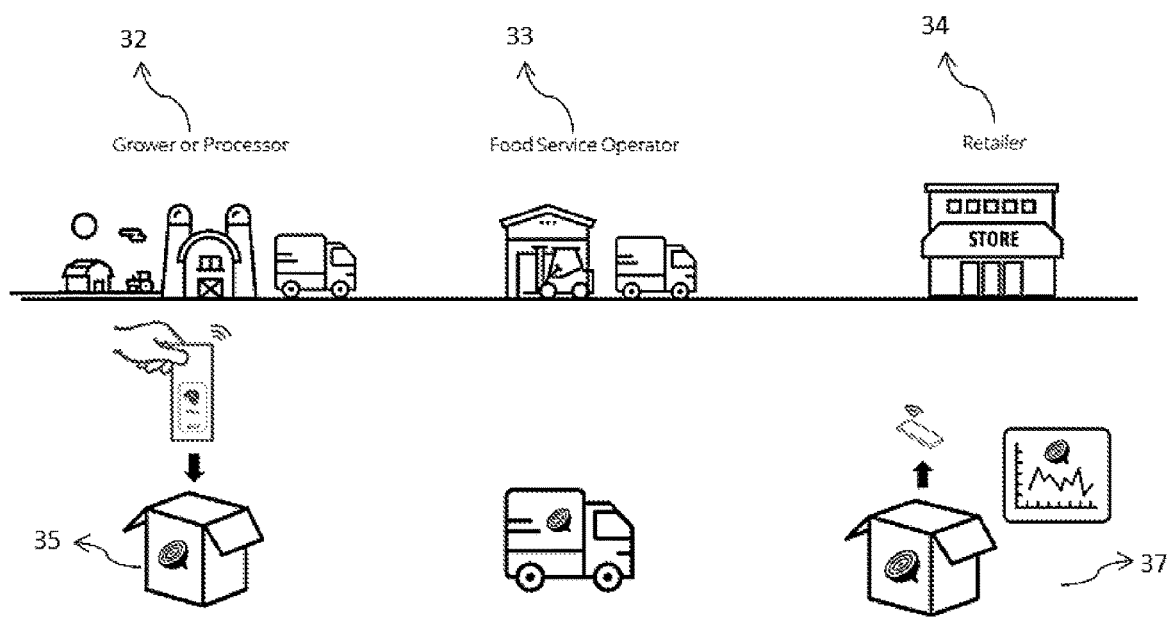
FIG. 8 illustrates the use of a wireless sensor tag in a food service supply chain.

FIG. 8 illustrates an embodiment using a wireless sensor tag 26 in a food service supply chain. The grower or processor 32 sends the product to be monitored, 29, e.g., a food item, along with a wireless sensor tag 26. The sensor tag 26 starts collecting the data during transportation 36. When the product to be monitored 29 reaches the food service operator 33 or the retailer 34, the stored data 27 in the sensor tag's memory 40 is transferred 37 as soon as communication is established with the sensor tag 26.

Figure 9:
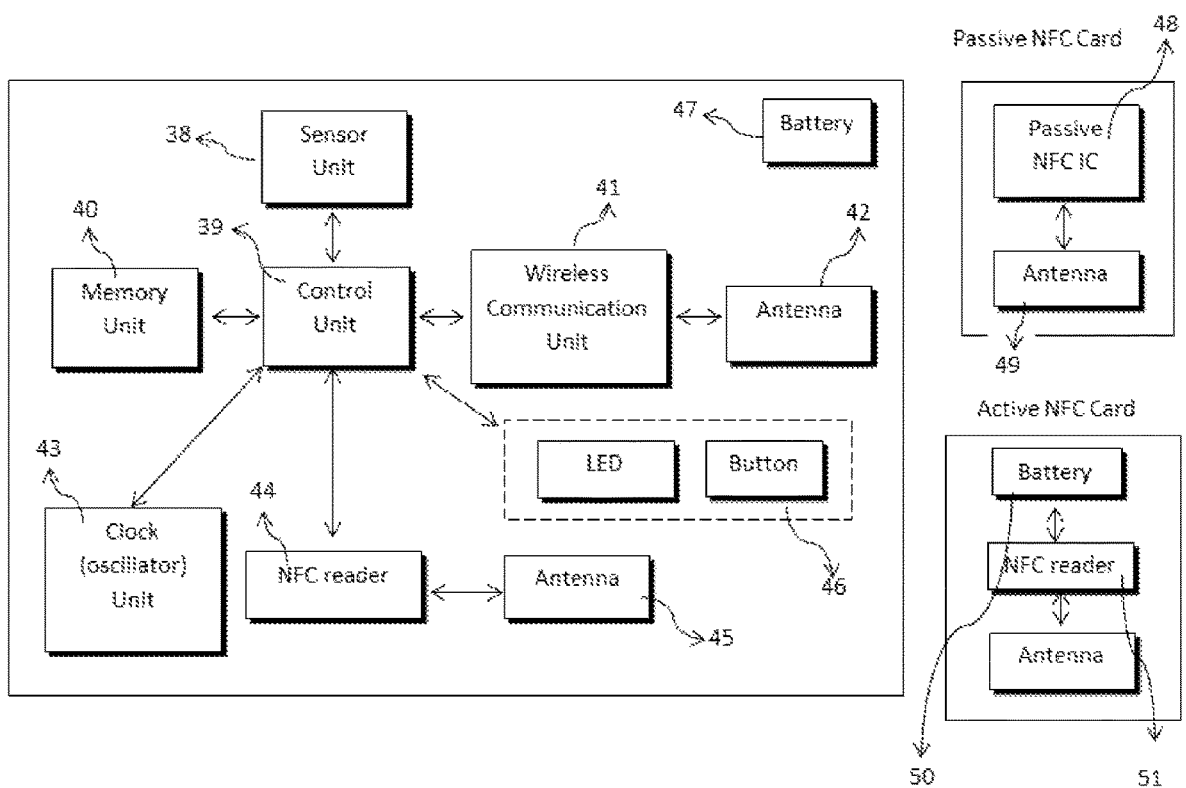
FIG. 9 shows a block diagram of an embodiment of a sensor tag 26, a passive NFC-enabled card 50, and an active NFC-enabled card 51.
Figure 10:
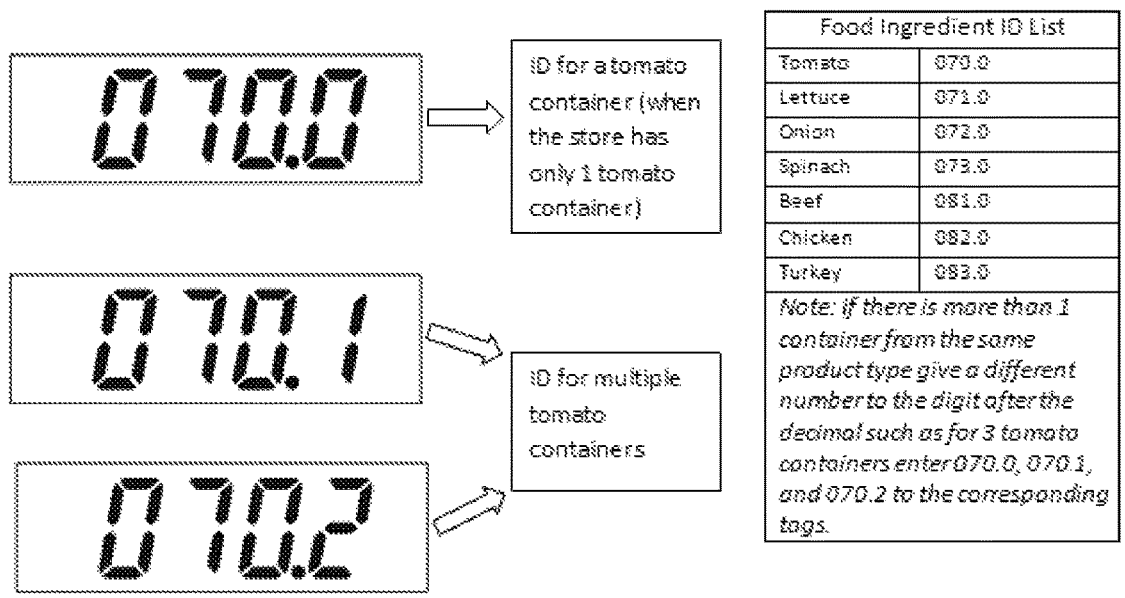
FIG. 10 shows an example of food products ID's and the food ingredients and/or food items corresponding to such food products ID's.
Figure 11:
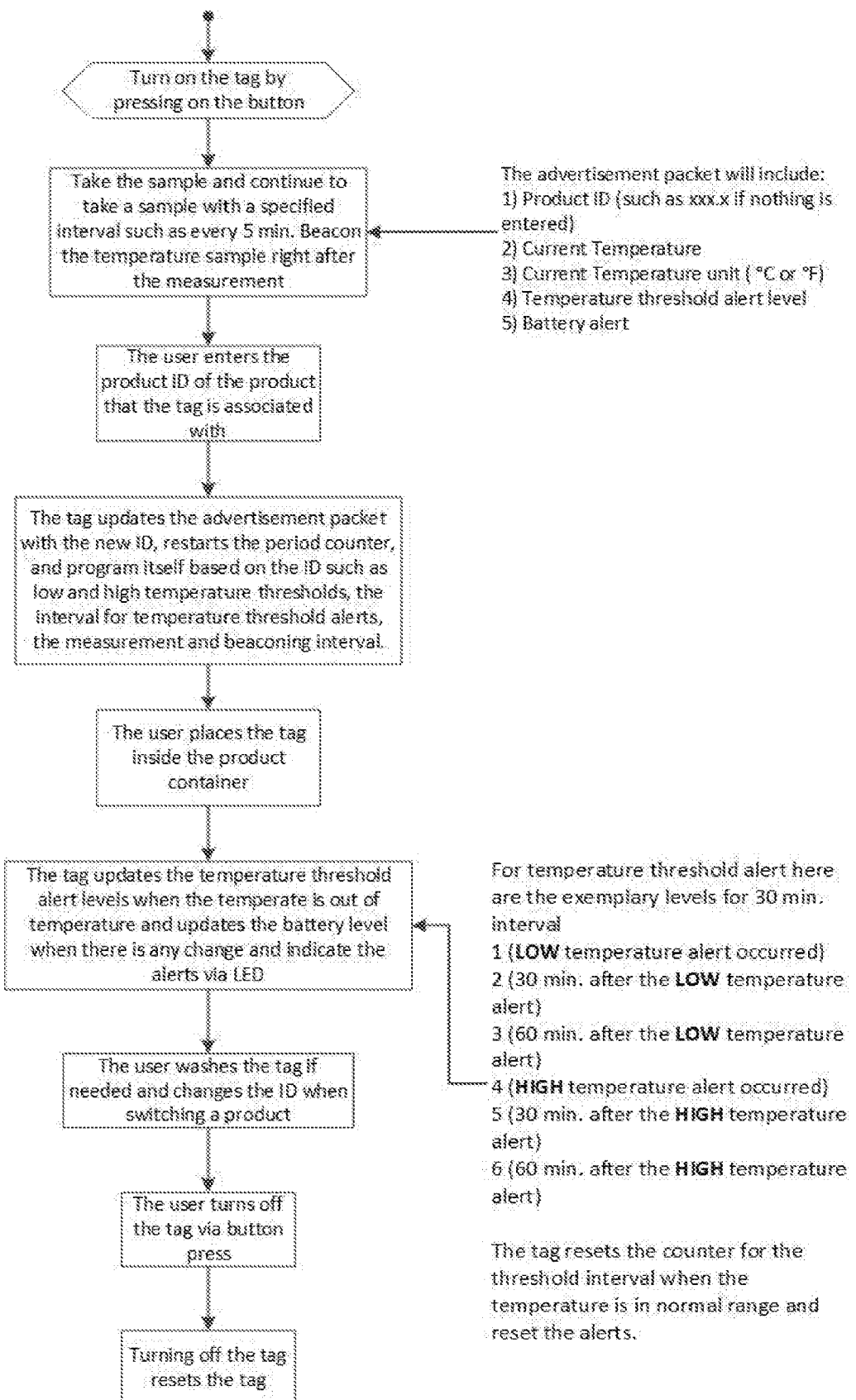
FIG. 11 shows a flow chart illustrating an embodiment of programming the wireless sensor tag via a display positioned on the wireless sensor tag.

FIG. 9 illustrates sample block diagrams of a wireless sensor tag 26, a passive NFC-enabled card 50, and an active NFC-enabled card 51. The passive NFC-enabled card 50 and/or the active NFC-enabled card 51 can be programmed via NFC. The sensor tag 26 of FIG. 9 includes one or more sensor unit(s), such as temperature, humidity, and/or light 38, a control unit (such as a microprocessor) 39, a memory unit 40, a wireless communication unit (such as BL, BLE, Wi-Fi, and/or Zigbee) 41, an antenna of the wireless communication unit (e.g., BL, BLE, Wi-Fi, and/or Zigbee) 42, a clock unit 43, an NFC reader 44, an NFC antenna 45, user interface components (such as LED and buttons (optional)) 46, and a battery 47. The passive NFC-enabled card 50 includes a passive NFC IC 48 and an NFC antenna 45. In a further embodiment, the sensor tag 26 shown in FIG. 9 may contain the passive NFC IC 48 shown in the passive NFC-enabled card 50 of FIG. 9, instead of the NFC reader 44 shown in sensor tag 26 of FIG. 9, such that the active NFC-enabled card 51 that has a battery 47, an NFC reader 44, and an NFC antenna 45, can be used to program the sensor tag 26.

The food service operator can then capture the temperature of each food item or ingredient at certain time intervals, certain times, or on a time schedule appropriate for the food item or ingredient and the situation, such as every thirty minutes throughout the day. The sensor data can be stored in the sensor tag 26 and the operator can obtain the sensor data 27 when it is needed by reading the sensor tag.

In accordance with an embodiment, to program the sensor tags 26 without any external computing device and associate the food items and/or ingredients to the sensor tags 26, the operator uses a wireless sensor tag 26 that has a display, such as a low power consuming display. Examples of such low power displays 26 include an electronic paper (e-paper) display, a bi-stable liquid crystal display (LCD), and a reflective LCD display. The sensor tag 26 can also have at least one button that is connected to a processor inside the sensor tag. In a specific embodiment, the user can program the wireless sensor tag 26 by entering a number, or other identifier, that determines one or more parameters related to each food item or ingredient that the tag is used for, such as food or ingredient category, food or ingredient name, stock keeping unit (SKU) number, and parameters related to settings in the tag, such as minimum and maximum temperatures (low and high temperature thresholds), exposure interval of low and high temperatures, reading frequency, event triggers, and communication settings. The number that determines the configuration settings on the tag can be pre-defined in the memory of the tag, but other parameters related to the product do not have to be stored in the tag's memory.

In an embodiment, the display is segmented with alphanumeric having digits that have small font sizes (such as 6 mm height) to lower the power consumption, and thus extend the battery life of the sensor tag. The display may also have segmented signs to indicate battery life and the alerts, such as low/high temperature thresholds, and communication errors.

In an embodiment, the display can be controlled via one or more buttons. In a specific embodiment, referring to FIGS. 1 and 2, the wireless sensor tag 26 has 3 buttons: 1 button to turn on/off the sensor tag and 2 buttons to control the content displayed (e.g., 1 button to activate the digit, and 1 button to count the numbers). Other combinations of buttons with alternative operations can be used in additional embodiments. The tables below show an exemplary user interface of a sensor tag that has 1 LED, 4 digits display and 3 buttons:

| | Task/Status | Switch | LED | Display |
|---|---|---|---|---|
| 1 | Activate TAG | Press and hold on the on/off button 3 sec. | Green LED on "X" minutes | Shows "_ _ _._" sign |
| 2 | Turn off tag | Press on the on/off button 3 sec. | Blinks red LED once | Nothing is displayed |
| 3 | Battery at 15% | None | Blinks red once in every "X" minutes | Shows image "BAT Low" |
| 4 | Force Temp Reading | Press twice on "activation button" | None | Shows temperature and comes back to ingredient ID after "X" minutes |
| 5 | Force communication (This action turns on BLE for communication "x" minutes) | Press once on the on/off button | Blinks green LED once | None |

| Programming the Tag | | | | |
|---|---|---|---|---|
| | Task/Status | Switch | LED | Display |
| 1 | Start programming | Press and hold on the "activation button" 3 sec. | None | Shows "0 (zero)" on the first digit and flashes the programming signal |
| 2 | Enter first number | Press and release on the "number counting button" until the desired number displayed | None | The number "0" increases |
| | | Press "activation button" once | None | Shows selected number |

-continued

Programming the Tag

| Task/Status | Switch | LED | Display |
|---|---|---|---|
| | to accept the number | | in the first digit and the second digit turns to "0". |
| 3 Enter second number | Press and release on the "number counting button" until the desired number displayed | None | The number "0" increases |
| | Press "activation button" once to accept the number | None | Shows selected number in the second digit and the third digit turns to "0". |
| 4 Enter third number | Press and release on the "number counting button" until the desired number displayed | None | The number "0" increases |
| | Press "activation button" once to accept the number | None | Shows selected number in the third digit and the fourth digit turns to "0". |
| 5 Enter fourth number | Press and release on the "number counting button" until the desired number displayed | None | The number "0" increases |
| | Press "activation button" once to accept the number (after the fourth number is selected the tag ID is programmed) | Flashes | Shows selected number in the fourth digit and the programing signal disappears |

This exemplary sensor tag 26 can use Bluetooth Low Energy (BLE) for wireless communication with a reader or other system component that receives a data signal transmitted by the sensor tag, which carries the sensor data. This sensor tag 26 can also have a temperature sensor, a 4 digit segmented display that can show the current temperature and the programmed number, 1 LED, 3 buttons, a microcontroller, an LCD driver, and a battery.

The temperature sensor 15 is preferably located at the bottom portion of the sensor tag to ensure that when the sensor tag is inserted into the food product (e.g., food item), the temperature sensor will be in contact with the food item, or in close enough proximity to the food item to accurately measure a temperature of the food item, and preferably remain in such relative position to the food item. The display and the buttons are preferably at the top portion of the sensor tag so that the user can easily see the number, or other symbol or icon, on the display when needed.

The housing material of the sensor tag is preferably food grade material that creates a seal between the electronics inside and the food item, and provides waterproofing so that the sensor tag can be washed and reused. The sensor tag is preferably sealed and constructed in a way that the sensor tag does not have any gaps or groves that food can get caught in. In an embodiment, the parts of the sensor tag are ultrasonically welded and the display and button(s) are on a film that is combined to the plastic in an in-mold-decoration technique instead of an overlay.

In another embodiment, instead of a manual programming of the sensor tag via an interface, a more automated method is used. In one such embodiment, an employee (or other user) uses NFC-enabled cards having identifiers as to the food item or ingredient, such as multiple NFC-enabled cards, where each NFC-enabled card shows an illustration and/or name of one of the corresponding multiple food items or ingredients in the restaurant (e.g., tomatoes, lettuce, tuna, chicken, cheese, and olives) to program the wireless temperature sensor tags, by placing the wireless temperature sensor tag near (e.g., within a threshold distance, such as 10 cm) the NFC-enabled card for a very brief period of time (such as at least 1 second, at least 0.5 second, at least 2 seconds, and/or at least 1.5 seconds). In an embodiment, an LED on either the wireless temperature sensor tag, or the NFC-enabled card, can flash (or flash in a specific manner) when the tag has been successfully programmed.

In another embodiment, NFC-enabled stickers, with the picture, or other identifier, of the food item or ingredient, are used to program the wireless temperature sensor tags, by placing the NFC sticker on the tag, where the sticker is held on the sensor tag via an adhesion or other connective force mechanism. The sensor tag can be configured such that when the NFC-enabled sticker is later removed from the wireless temperature sensor tag, the program of the wireless temperature sensor tag will not change until another NFC-enabled sticker is placed in sufficient proximity to the sensor tag for a sufficient time period, such as by placing another NFC-enabled sticker on the sensor tag.

In another embodiment, the NFC-enabled card is attached to the tag or bundled together with the tag. Alternative embodiments can require a button or other actuation mechanism to be pushed or actuated in order for programming of the sensor tag to occur.

In another embodiment, the NFC-enabled sticker can be placed on the container the food item or ingredient is placed in, and when the wireless temperature sensor tag is placed inside the container for a sufficient time period, near the NFC-enabled sticker, the tag will be automatically programmed.

In another embodiment, the sensor tag can be programmed with an NFC-enabled card, sticker, sheet, or fob, and the sensor tag can have a display that shows the programmed number, or other identifier, so that the user can make sure that the tags are placed in the right containers.

In another embodiment, the wireless temperature sensor tag incorporates passive NFC components, such as a passive NFC IC, while the NFC-enabled card has active NFC components (such as an NFC reader, antenna, and battery), and the NFC-enabled card acts as an interrogator via the active NFC components to trigger the sensor tag to emit a data signal with the sensor data. Such data signal can then be received by the NFC-enabled card or by another receiver in the vicinity of the sensor tag.

In another embodiment, NFC-enabled cards can be configured as a sheet, where each sheet contains multiple food items or ingredients, where each NFC-enabled section associated with a food item or ingredients has its own NFC components. In an embodiment, each of multiple sheets is an interrogator, and one reader chip can control multiple food items, where each food item is associated with an antenna.

In a specific embodiment, a quick-serve restaurant franchise owner, who does not want restaurant employees to use their personal mobile devices to program wireless temperature sensor tags, or wishes to provide an alternative manner for employees to program the sensor tags if they opt out of using their personal mobile devices, can use an embodiment of the subject method and apparatus as discussed with respect to FIGS. 1-10.

In a specific embodiment, a food service operator that is a school district cafeteria providing meals to students can use an embodiment of the subject method and apparatus as discussed with respect to FIGS. 1-10. In one such embodiment, monthly or weekly menus are created in advance; food items are ordered from suppliers and stored in coolers and freezers; and meals (e.g., menu items) are prepared daily and placed in plastic or stainless steel chafers for serving. Wireless temperature sensor tags in accordance with an embodiment of the subject invention, e.g., as discussed with respect to FIGS. 1-10, are placed in the chafers in contact with, or in close proximity to, the food (e.g., menu item). The school district cafeteria can then print NFC-enabled cards associated with their respective monthly or weekly menu items. The school district cafeteria can use the subject wireless temperature tags, such that each morning, cafeteria employees program each of one or more wireless temperature sensor tags for a corresponding one or more menu items with each NFC-enabled card corresponding to one of the menu items. Each NFC-enabled card can contain information (e.g., be programmed to implement a temperature measurement procedure using such information) such as: operating temperature threshold, maximum temperature, minimum temperature, reading frequency, and one or more other parameters related to the temperature measurement procedure. Using an embodiment of the subject method and system, e.g., as discussed with respect to FIGS. 1-10, the school district cafeteria can display temperature data from food items or ingredients (e.g., menu items) on a display, receive notifications in case of any deviations of the temperature from the desired range or other criteria, and automate preparation of food safety reports.

In a specific embodiment, a method and system, e.g., as discussed with respect to FIGS. 1-10, can be used by a food service operator that is a national food retailer with a large self-serving prepared foods section in supermarkets, where the large self-serving prepared foods section attracts many customers during lunch and dinner hours. Employees responsible for this department can be required to keep track of the temperature the food served during the day has experienced as a function of time during a desired period of time (such as from placing the food to be served out for display until the food is removed from the display by the customer) to assure quality and minimize food safety risks. To accomplish this, wireless temperature sensor tags in accordance with an embodiment of the invention as discussed with respect to FIGS. 1-10 can be used to capture the temperature of each prepared or ready-to-eat cold and hot food item during the desired time period. Retailers, e.g., the supermarket where the self-serving prepared foods sections are located, can print out NFC-enabled cards at the store for the prepared and ready-to-eat foods for sale daily that are to be monitored, and program wireless temperature sensor tags with the NFC-enabled cards. If the supermarket's policy does not allow employees to use mobile phones during working hours, or some employees opt not to use their mobile phones, the embodiment of the subject method and apparatus can be implemented without the need for such mobile phones. Although supermarkets are already familiar with using devices such as temperature loggers, barcode readers, RFID readers, and mobile tablets, supermarket executives may prefer to use NFC-enabled cards to program wireless temperature sensor tags, in accordance with the subject invention (e.g., as discussed with respect to FIGS. 1-10), due to simplicity, speed, and cost savings.

In an embodiment, the food service operator can utilize wireless temperature sensor tags to audit the temperature of food items and ingredients delivered to the food service operator's stores during desired time periods of such delivery process. The food service operator can provide entities that supply perishable products, such as fruits, vegetables, meats, dairy, seafood, and bakery, to the food service operator, with wireless temperature sensor tags, as well as NFC-enabled cards corresponding to the items shipped by each supplier. One or more suppliers can then use NFC-enable cards to program the wireless temperature sensor tags, e.g., prior to shipment of the product or at some other point in the delivery process. In this way, such suppliers do not need a handheld programmer/reader or mobile device to program and commission the wireless temperature sensor tags, saving valuable time and expense.

The wireless sensor tag 26 in FIG. 9 has an NFC reader 44 and NFC antenna 45. In an embodiment, the wireless sensor tag has an active NFC reader, such as an active NFC-enabled card, where active NFC conveys an NFC reader/writer. As used in the subject application "NFC reader" has the capability to read, and can, optionally, also have the capability to write.

The NFC reader 44 and NFC antenna 45 in the wireless sensor tag 26 in FIG. 9 can be replaced by the Active NFC card 51 (active NFC-enabled card) in FIG. 9, or by the passive NFC card of FIG. 9.

The NFC standard has three different modes that it uses to operate: peer-to-peer, read/write, and card emulation. Peer-to-peer allows for two active tags to write to each other, read/write is directed toward one device and card emulation allows a device to function like a passive tag. The Active NFC-enabled card in FIG. 9 can also have a memory unit (like memory unit 40). The NFC reader 44 can have an NFC chip that contains an EPROM memory that stores the ID, which can serve the function of memory unit 40. The passive, and active, NFC card can have memory, which is not shown in FIG. 9 (as memory unit 40 is shown).

The differences between an NFC reader and a passive NFC tag, which can be used with specific embodiments of the invention, include:

An NFC network includes two devices, namely an initiator and a target. There are two basic modes of operation in NFC network known as active and passive. In NFC active mode, both initiator and target devices will have their own power supply or battery for operation. In NFC passive mode, one of the NFC devices will have power of its own while other device is full passive and derive its power from active powered device.

In a specific embodiment, both NFC tag and NFC reader communicate using 13.56 MHz frequency for operation, and use ASK modulation for modulating the data to be transmitted before being translated on RF carrier of 13.56 MHz.

The NFC devices can utilize electromagnetic induction between loop antennas for connecting.

In a specific embodiment, an NFC tag includes an EEPROM, a processor or microcontroller unit, an anti-collision algorithm, an authentication and cryptographic mechanism, an RF interface circuit, and an RF antenna operating at 13.56 MHz.

In a specific embodiment, different types of tags, developed based on various applications of use such as type-1 tag, type-2 tag, type-3 tag, type-4 tag and type-5 tag (known as Mifare classic tag), can be used. In a specific embodiment, the generic parameters of an NFC tag considered during the selection process include:

NFC Tag can be either active or passive device.
memory storage limit
speed of operation
data access mode read/write or read only, and
collision mechanism In a specific embodiment, an NFC tag can transfer data at the rate from 106 kbps to 424 kbps.

In a specific embodiment, an NFC reader can include a microcontroller unit such as LPC series, NFC reader IC, antenna matching circuit, and 13.56 MHz loop antenna. In a specific embodiment, ICs used in the NFC reader can be one of the following: CLRC663, PN512, SLRC610, PR601, MFRC522, and PN7120 developed by NXP semiconductor.

In a specific embodiment, the generic features of an NFC reader are as follows:

NFC reader is always an active device.
host interface, e.g. SPI, I²C, RS232, UART etc. are available.
EEPROM is used to store NFC protocol and commands, and
FIFO (i.e. buffer) is used to handle transmit and receive data frames.

In a specific embodiment, an IC can be used in NFC reader 44, or active NFC card 51, such as the TRF7970A Multiprotocol Fully Integrated 13.56-MHz RFID and Near Field Communication (NFC) Transceiver IC (Rev. L), which has the following features.
supports Near Field Communication (NFC) Standards NFCIP-1 (ISO/IEC 18092) and NFCIP-2 (ISO/IEC 21481);
completely Integrated Protocol Handling for ISO/IEC 15693, ISO/IEC 18000-3, ISO/IEC 14443 A and B, and FeliCa™;
integrated Encoders, Decoders, and Data Framing for NFC Initiator, Active and Passive Target Operation for All Three Bit Rates (106 kbps, 212 kbps, 424 kbps), and Card Emulation; RF Field Detector With Programmable Wake-up Levels for NFC Passive Transponder Emulation Operation;
RF Field Detector for NFC Physical Collision Avoidance;
Integrated State Machine for ISO/IEC 14443 A Anticollision (Broken Bytes) Operation (Transponder Emulation or NFC Passive Target);
Input Voltage Range: 2.7 VDC to 5.5 VDC;
Programmable Output Power: +20 dBm (100 mW), +23 dBm (200 mW);
Programmable I/O Voltage Levels From 1.8 VDC to 5.5 VDC;
Programmable System Clock Frequency Output (RF, RF/2, RF/4) from 13.56-MHz or 27.12-MHz
Crystal or Oscillator;
Integrated Voltage Regulator Output for Other System Components (MCU, Peripherals, Indicators), mA (Max);
Programmable Modulation Depth;
Dual Receiver Architecture With RSSI for Elimination of "Read Holes" and Adjacent Reader System or Ambient In-Band Noise Detection;
Programmable Power Modes for Ultra Low-Power System Design (Power Down<1 µA)
Parallel or SPI Interface (With 127-Byte FIFO);
Temperature Range: −40° C. to 110° C.; and
32-Pin QFN Package (5 mm×5 mm);

The TRF7970A device is an integrated analog front end (AFE) and multiprotocol data-framing device for a 13.56-MHz NFC/RFID system supporting all three NFC operation modes—reader/writer, peer-to-peer, and card emulation according to ISO/IEC 14443 A and B, Sony FeliCa, ISO/IEC 15693, NFCIP-1 (ISO/IEC 18092), and NFCIP-2 (ISO/IEC 21481). Built-in programming options make the device suitable for a wide range of applications for NFC, proximity, and vicinity identification systems.

The TRF7970A device is configured by selecting the desired protocol in the control registers. Direct access to all control registers allows fine tuning of various reader parameters as needed.

The TRF7970A device supports data rates up to 848 kbps with all framing and synchronization tasks for the ISO protocols onboard. The TRF7970A device also supports reader and writer mode for NFC Forum tag types 1, 2, 3, 4, and 5. Other standards and even custom protocols can be implemented by using one of the direct modes the device offers. These direct modes let the user fully control the AFE and also gain access to the raw subcarrier data or the unframed, but already ISO-formatted, data and the associated (extracted) clock signal.

The receiver system has a dual-input receiver architecture to maximize communication robustness. The receivers also include various automatic and manual gain control options. The received signal strength from transponders, ambient sources, or internal levels is available in the RSSI register.

A SPI or parallel interface can be used for the communication between the MCU and the TRF7970A device. When the built-in hardware encoders and decoders are used, transmit and receive functions use a 127-byte FIFO register. For direct transmit or receive functions, the encoders or decoders can be bypassed so the MCU can process the data in real time.

The TRF7970A device supports a wide supply voltage range of 2.7 V to 5.5 V and data communication levels from 1.8 V to 5.5 V for the MCU I/O interface.

The transmitter has selectable output power levels of 100 mW (+20 dBm) or 200 mW (+23 dBm) equivalent into a 50-Ω load when using a 5-V supply and supports OOK and ASK modulation with selectable modulation depth.

The built-in programmable auxiliary voltage regulator delivers up to 20 mA to supply an MCU and additional external circuits within the reader system.

Integrated RF field detector with programmable wake-up levels, eight selectable power modes, and ultra-low power operation enable easy development of robust and cost-efficient designs for long battery life.

In a specific embodiment, an IC that can be used in the passive NFC card 48 is the RF430FRL5xH NFC ISO 15693 Sensor Transponder (Rev. C), which has the following features:
ISO/IEC 15693, ISO/IEC 18000-3 (Mode 1) Compliant RF Interface;
Power Supply System With Either Battery or 13.56-MHz H-Field Supply;
14-Bit Sigma-Delta Analog-to-Digital Converter (ADC);
Internal Temperature Sensor;

Resistive Sensor Bias Interface;
CRC16 CCITT Generator;
MSP430™ Mixed-Signal Microcontroller;
2 KB of FRAM;
4 KB of SRAM;
8 KB of ROM;
Supply Voltage Range: 1.45 V to 1.65 V;
Low Power Consumption;
Active Mode (AM): 140 µA/MHz (1.5 V);
Standby Mode (LPM3): 16 µA;
16-Bit RISC Architecture;
Up to 2-MHz CPU System Clock;
Compact Clock System;
4-MHz High-Frequency Clock;
256-kHz Internal Low-Frequency Clock Source;
External Clock Input;
16-Bit Timer_A With Three Capture/Compare Registers;
LV Port Logic;
$V_{OL}$ Lower Than 0.15 V at 400 µA;
$V_{OH}$ Higher Than ($V_{DDB}$-0.15 V) at 400 µA;
Timer_A PWM Signal Available on All Ports;
eUSCI_B Module Supports 3-Wire and 4-Wire SPI and I²C;
32-Bit Watchdog Timer (WDT_A);
ROM Development Mode (Map ROM Addresses to SRAM to Enable Firmware Development);
Full 4-Wire JTAG Debug Interface;

The RF430FRL15xH device is a 13.56-MHz transponder chip with a programmable 16-bit MSP430™ low-power microcontroller. The device features embedded universal FRAM nonvolatile memory for storage of program code or user data such as calibration and measurement data. The RF430FRL15xH supports communication, parameter setting, and configuration through the ISO/REC 15693, ISO/IEC 18000-3 compliant RFID interface and the SPI or I²C interface. Sensor measurements are supported by the internal temperature sensor and the onboard 14-bit sigma-delta analog-to-digital converter (ADC), and digital sensors can be connected through SPI or I²C.

The RF430FRL15xH device is optimized for operation in fully passive (battery-less) or single-cell battery-powered (semi-active) mode to achieve extended battery life in portable and wireless sensing applications. FRAM is a nonvolatile memory that combines the speed, flexibility, and endurance of SRAM with the stability and reliability of flash, all at lower total power consumption.

In a specific embodiment, an NFC readers is used that does not have an internal antenna. The difference between the NFC reader and the active NFC enabled card is that the active NFC-enabled card is pre-programmed card that can write this information to any NFC tag (or any NFC enabled device is peer to peer is enabled). The NFC reader cab be just a reader that reads/writes any tag in close proximity. The passive NFC-enabled card is a pre-programmed card vs passive NFC IC, which is just an IC that enables NFC communication.

In a specific embodiment, the difference between NFC reader 44 and active NFC card 51 in terms of function is as follows: NFC reader in 44 reads a tag that is in close proximity. The microcontroller gets this information and make any changes in the tag configuration based on this information and saves the ID (or this information), where NFC reader 51 has a special firmware in it that reads and then writes to the tags in close proximity to the information stored in its memory and this memory can either be programmed/written during the manufacturing or via another NFC enabled card or device. If the active NFC card is not programmed during the manufacturing, it can have a button and LED. If a sheet enabled with active NFC for multiple products is used, the sheet can have a microcontroller as well.

In a specific embodiment, as the wireless sensor tag in FIG. 4 does not have a passive NFC IC 48 shown in the passive NFC card 50 (passive NFC-enabled card 50) in FIG. 9, a passive NFC IC 48 can be added to the wireless sensor tag in FIG. 4, as well as an (NFC antenna along with the NFC IC.

The wireless communication unit 18, antenna 19, clock 20, control unit 16, and memory unit 17 in FIG. 4 can be the same as the wireless communication unit 41, antenna 42, clock 43, control unit 39, and memory unit 40 used in FIG. 9.

In a specific embodiment, temperature sensors are used, such as: resistance temperature detectors (RTDs), thermocouples, thermistors, infrared sensor, and semiconductor sensors. The sensor can take the sensor data whenever the microcontroller instructs the sensor to take the sensor data. In a specific embodiment, the microcontroller can instruct the sensor unit, the memory unit, and the wireless communication unit what to do and what to store. In a specific embodiment, the following parameters are programmed:
  a) When and how often to take the sensory data
  b) The temperature thresholds when the alarm is triggered
  c) The ID associated with the product
  d) The communication settings
  e) The temperature threshold levels and intervals In a specific embodiment, when using a display, programming includes:
  user enters the ID of the product on the display;
  the information on the display driver is sent to microcontroller;
  microcontroller saves this information on the memory (it could be either the memory in the controller or an external memory);
  based on this ID number the microcontroller looks at a table already stored in the memory to configure the parameters listed above;
  sensor measures the temperature based on microcontroller input; and
  the Bluetooth unit sends the product ID along with the sensor data to Bluetooth receiver.

In a specific embodiment, programming via NFC, when the card is passive can be accomplished as follows:
  a computational device that is equipped with NFC reader such as a printer, smartphone, and etc. will program the passive card prior to be sent to the user;
  user presses on a button on the tag and bring it closer to the card;
  the NFC reader on the tag turns on scanning. It reads the card;
  microcontroller stores the ID and/or any information related to configuration of the tag in the memory and configures the tag;
  sensor measures the temperature based on microcontroller input; and
  the Bluetooth unit sends the product ID along with the sensor data to Bluetooth receiver In a specific embodiment, when the card is active (meaning that it has the NFC reader), the active NFC enabled card is programmed either during manufacturing or via another NFC enabled card or device, as follows:
  user brings the tag closer to the card and press a button on the card (not on the tag);
  the card reads the tag and writes to the tag;

the microcontroller stores the ID and/or any information related to configuration of the tag in the memory and configures the tag;

sensor measures the temperature based on microcontroller input; and the Bluetooth unit sends the product ID along with the sensor data to Bluetooth receiver.

In a specific embodiment, food product can be a food item, an ingredient, and/or a menu item.

EMBODIMENTS

Embodiment 1. A method for programming a wireless sensor tag for a monitoring operation, comprising:

providing a wireless sensor tag, wherein the wireless sensor tag is NFC-enabled to receive an NFC signal, wherein the wireless sensor tag comprises at least one memory, wherein the wireless sensor tag is wireless communication enabled with respect to at least one wireless communications protocol other than NFC;

providing an NFC-enabled device, wherein the NFC-enabled device is enabled to transmit an NFC data signal to the wireless sensor tag, wherein the NFC-enabled device comprises an internal memory, wherein programming parameters corresponding to an object to be monitored by the wireless sensor tag are stored in the internal memory, wherein the NFC data signal transmitted to the wireless sensor tag includes the programming parameters, wherein the wireless sensor tag is configured to receive the NFC data signal when the wireless sensor tag is in range of the NFC-enabled device, wherein the at least one memory is configured to store the programming parameters included in the NFC data signal received by the wireless sensor tag; and positioning the wireless sensor tag in range of the NFC-enabled device, such that the wireless sensor tag receives the NFC data signal transmitted by the NFC-enabled device.

Embodiment 2. The method according to embodiment 1, wherein providing a wireless sensor tag comprises providing a wireless temperature sensor tag.

Embodiment 3. The method according to embodiment 1, wherein the object to be monitored is a food item or ingredient, and wherein programming parameters correspond to the food item or ingredient.

Embodiment 4. The method according to embodiment 1, wherein the wireless sensor tag is NFC-enabled to transmit an NFC transmit signal to the NFC-enabled device.

Embodiment 5. The method according to embodiment 1, wherein the at least one wireless communication protocol other than NFC includes one or more wireless communication protocols selected from the group consisting of:

Low-Energy Bluetooth (BLE)™, WI-FI, and cellular.

Embodiment 6. The method according to embodiment 5, wherein the NFC-enabled device is a sticker.

Embodiment 7. The method according to embodiment 5, wherein the NFC-enabled device is a card.

Embodiment 8. The method according to embodiment 5, wherein the NFC-enabled device is a fob.

Embodiment 9. The method according to embodiment 5, wherein the NFC-enabled device is a sheet containing multiple food items or ingredients.

Embodiment 10. The method according to embodiment 1, wherein the wireless sensor tag comprises a sensor unit, and wherein the at least one memory is configured to store sensor data collected by the sensor unit.

Embodiment 11. The method according to embodiment 1, wherein the wireless sensor tag comprises a display and at least one button for programming, and wherein the display and the at least one button are configured to allow a user to enter programming parameters corresponding to an object to be monitored by the wireless sensor tag.

Embodiment 12. The method according to embodiment 11, further comprising:

providing the user a list of a plurality of objects to potentially be monitored by the wireless sensor tag, wherein each object on the list is assigned a corresponding number of a corresponding plurality of numbers.

Embodiment 13. The method according to embodiment 11, wherein the display is a low-power LCD display.

Embodiment 14. The method according to embodiment 13, wherein the low-power LCD display is selected from the group consisting of:

an electronic paper (e-paper) display, a bi-stable liquid crystal display, and a reflective LCD display.

Embodiment 15. The method according to embodiment 11, wherein the display is a segmented alphanumeric display.

Embodiment 16. A method for monitoring a food product using a wireless sensor tag, comprising:

providing a wireless sensor tag, wherein the wireless sensor tag comprises:

a display;

a sensor unit;

at least one memory, wherein the at least one memory is configured to store sensor data collected by the sensor unit;

a wireless communication unit, wherein the wireless communication unit is configured to transmit sensor data collected by the sensor unit and stored in the at least one memory, wherein the wireless sensor tag is configured to be associated with a food product of a plurality of food products upon being programmed via a corresponding food product ID number of a corresponding plurality of food product ID numbers, wherein the display is configured to show the food product ID number of the plurality of food product ID numbers the wireless sensor tag is associated with after programming;

programming the wireless sensor tag with a first food product of the plurality of food products, showing the first food product ID number of the plurality of food product ID numbers the wireless sensor tag is associated with after programming;

positioning the wireless sensor tag with respect to the first food product of the plurality of food products such that the sensor unit collects sensor data with respect to the first food product of the plurality of food products and stores the sensor data with respect to the first food product of the plurality of food products in the at least one memory; and transmitting the sensor data with respect to the first food product of the plurality of food products stored in the at least one memory.

Embodiment 17. The method according to embodiment 16, wherein the wireless sensor tag further comprises:

a control unit, wherein the control unit controls the sensor unit based on the food product of the plurality of food products the wireless sensor tag is associated with.

Embodiment 18. The method according to embodiment 17,
wherein the controls unit interconnects with the sensor unit, the at least one memory, the communication unit, and the display, so as to send and/or receive one or more signals to and/or from the sensor unit, the at least one memory, the communication unit, and the display.

Embodiment 19. The method according to embodiment 16,
wherein the wireless sensor tag comprises at least one button for a user to enter the food product ID number of the plurality of food product ID numbers.

Embodiment 20. The method according to embodiment 19, further comprising:
providing the user a list of the plurality of food products,
wherein each food product of the plurality of food products on the list is assigned the corresponding food product ID number of the corresponding plurality of food product ID numbers.

Embodiment 21. The method according to embodiment 16,
wherein the at least one memory is configured to store the first food product ID number of the plurality of food product ID numbers the wireless sensor tag is associated with after programming.

Embodiment 22. The method according to embodiment 16,
wherein wireless sensor tag is configured to:
store at least a part of the food product ID number of the plurality of food product ID numbers the wireless sensor tag is associated with after programming in the at least one memory; or
store at least a part of the food product ID number of the plurality of food product ID numbers the wireless sensor tag is associated with after programming in a data packet shared with a receiver of the communications unit during each periodic communication interval.

Embodiment 23. The method according to embodiment 16,
wherein the wireless sensor tag is NFC-enabled to receive an input NFC signal via the communications unit.

Embodiment 24. The method according to embodiment 23, further comprising:
transmitting an output NFC signal,
wherein the output NFC signal includes the first food product ID number of the plurality of food product ID numbers.

Embodiment 25. The method according to embodiment 16,
wherein the wireless sensor tag is configured to configure itself to implement certain configuration parameters, based on the food product ID number of the plurality of food product ID numbers the wireless sensor tag is associated with after programming.

Embodiment 26. The method according to embodiment 16,
wherein the wireless sensor tag is NFC-enabled to receive an input NFC signal via the communications unit, and
wherein the wireless sensor tag is wireless communication enabled with respect to at least one wireless communications protocol other than NFC to receive an input wireless communication with respect to the at least one wireless communications protocol other than NFC via the communications unit.

Embodiment 27. The method according to embodiment 23,
providing an NFC-enabled device,
wherein the NFC-enabled device is enabled to transmit the input NFC data signal to the wireless sensor tag,
wherein the NFC-enabled device comprises an internal memory,
wherein the plurality of food product ID numbers are stored in the internal memory,
transmitting the input NFC data signal to the wireless sensor tag via the NFC-enabled device,
wherein the input NFC data signal transmitted to the wireless sensor tag includes the first food product ID number of the plurality of food product ID numbers,
wherein the wireless sensor tag is configured to receive the input NFC data signal when the wireless sensor tag is in range of the NFC-enabled device,
wherein the at least one memory is configured to store the food product ID number of the plurality of food product ID numbers included in the input NFC data signal received by the wireless sensor tag; and
positioning the wireless sensor tag in range of the NFC-enabled device, such that the wireless sensor tag receives the input NFC data signal transmitted by the NFC-enabled device.

Embodiment 28. The method according to embodiment 16,
wherein providing a wireless sensor tag comprises providing a wireless temperature sensor tag.

Embodiment 29. The method according to embodiment 28,
wherein positioning the wireless sensor tag with respect to the first food product of the plurality of food products comprises positioning the wireless sensor tag such that the wireless temperature sensor tag is:
(i) in direct contact with first food product of the plurality of food products; or
(ii) in sufficient proximity to the first food product of the plurality of food products to measure temperatures that accurately reflect the temperature of the first food product of the plurality of food products being monitored.

Embodiment 30. The method according to embodiment 16,
wherein positioning the wireless sensor tag with respect to the first food product such that the sensor unit collects sensor data with respect to the first food product comprises positioning the wireless sensor tag with respect to the first food product, while the first food product is at a first location, such that the sensor unit collects sensor data with respect to the first food product,
further comprising:
transporting the first food product to be monitored, along with the wireless sensor tag, from the first location to a second location, such that the wireless sensor tag collects sensor data with respect to the first food product during transportation; and
upon the first food product to be monitored, along with the wireless sensor tag, reaching the second location, establishing communication with the wireless sensor tag and transferring the sensor data stored in the at least one memory,
wherein the sensor data stored in the at least one memory was collected during transportation.

Embodiment 31. The method according to embodiment 30,
wherein the first location is a grower or a processor, and
wherein the second location is a food service operator or retailer.

Embodiment 32. The method according to embodiment 16, wherein the wireless sensor tag is a wireless temperature sensor tag, wherein the sensor data stored in the at least one memory comprises:
(i) a temperature of the first food product at certain time intervals;
(ii) a temperature of the first food product at certain times; or
(iii) a temperature of the first food product at on a desired time schedule.

Embodiment 33. The method according to embodiment 32, wherein the sensor data stored in the at least one memory comprises the temperature of the first food product at thirty minute time intervals.

Embodiment 34. The method according to embodiment 16, wherein positioning the wireless sensor tag with respect to the first food product such that the sensor unit collects sensor data with respect to the first food product comprises positioning the wireless sensor tag with respect to the first food product, at a first time, such that the sensor unit collects sensor data with respect to the first food product, at a second time after the first time, establishing communication with the wireless sensor tag and transferring the sensor data stored in the at least one memory, wherein the sensor data stored in the at least one memory was collected between the first time and the second time.

Embodiment 35. The method according to embodiment 16, wherein the first food product is a first food item or ingredient.

Embodiment 36. The method according to embodiment 16, wherein the wireless sensor tag is NFC-enabled to transmit an output NFC signal to the NFC-enabled device.

Embodiment 37. The method according to embodiment 27, wherein the at least one wireless communication protocol other than NFC includes one or more wireless communication protocols selected from the group consisting of:

Low-Energy Bluetooth (BLE)™, WI-FI, and cellular.

Embodiment 38. The method according to embodiment 27, wherein the NFC-enabled device is a sticker.

Embodiment 39. The method according to embodiment 27, wherein the NFC-enabled device is a card.

Embodiment 40. The method according to embodiment 27, wherein the NFC-enabled device is a fob.

Embodiment 41. The method according to embodiment 27, wherein the NFC-enabled device is a sheet containing multiple food items or ingredients.

Embodiment 42. The method according to embodiment 16, wherein the display is a low-power LCD display.

Embodiment 43. The method according to embodiment 42, wherein the low-power LCD display is selected from the group consisting of:

an electronic paper (e-paper) display, a bi-stable liquid crystal display, and a reflective LCD display.

Embodiment 44. The method according to embodiment 16, wherein the display is a segmented alphanumeric display.

Embodiment 45. The method according to embodiment 17, wherein parameters with respect to which the control unit controls the sensor unit, based on the food product of the plurality of food products the wireless sensor tag is associated with, are stored in the at least one memory.

Embodiment 46. An apparatus for monitoring a food product using a wireless sensor tag, comprising:
a wireless sensor tag,
wherein the wireless sensor tag comprises:
a display;
a sensor unit;
at least one memory,
wherein the at least one memory is configured to store sensor data collected by the sensor unit;
a wireless communication unit,
wherein the wireless communication unit is configured to transmit sensor data collected by the sensor unit and stored in the at least one memory, wherein the wireless sensor tag is configured to be associated with a food product of a plurality of food products upon being programmed via a corresponding food product ID number of a corresponding plurality of food product ID numbers, wherein the display is configured to show the food product ID number of the plurality of food product ID numbers the wireless sensor tag is associated with after programming;

wherein the wireless sensor tag is configured to be programmed with a first food product of the plurality of food products, wherein the display is configured to show the first food product ID number of the plurality of food product ID numbers the wireless sensor tag is associated with after programming;

wherein the wireless sensor tag is configured such that, when positioned with respect to the first food product of the plurality of food products, the sensor unit collects sensor data with respect to the first food product of the plurality of food products and stores the sensor data with respect to the first food product of the plurality of food products in the at least one memory; and wherein the wireless sensor tag is configured to transmit the sensor data with respect to the first food product of the plurality of food products stored in the at least one memory.

Embodiment 47. The apparatus according to embodiment 46, wherein the wireless sensor tag further comprises:
a control unit,
wherein the control unit controls the sensor unit based on the food product of the plurality of food products the wireless sensor tag is associated with.

Embodiment 48. The apparatus according to embodiment 47, wherein the controls unit interconnects with the sensor unit, the at least one memory, the communication unit, and the display, so as to send and/or receive one or more signals to and/or from the sensor unit, the at least one memory, the communication unit, and the display.

Embodiment 49. The apparatus according to embodiment 46, wherein the wireless sensor tag comprises at least one button fora user to enter the food product ID number of the plurality of food product ID numbers.

Embodiment 50. The apparatus according to embodiment 49, further comprising:

a list of the plurality of food products, wherein each food product of the plurality of food products on the list is assigned the corresponding food product ID number of the corresponding plurality of food product ID numbers.

Embodiment 51. The apparatus according to embodiment 46, wherein the at least one memory is configured to store the first food product ID number of the plurality of food product ID numbers the wireless sensor tag is associated with after programming.

Embodiment 52. The apparatus according to embodiment 46, wherein wireless sensor tag is configured to:
store at least a part of the food product ID number of the plurality of food product ID numbers the wireless sensor tag is associated with after programming in the at least one memory; or
store at least a part of the food product ID number of the plurality of food product ID numbers the wireless sensor tag is associated with after programming in a data packet shared with a receiver of the communications unit during each periodic communication interval.

Embodiment 53. The apparatus according to embodiment 46, wherein the wireless sensor tag is NFC-enabled to receive an input NFC signal via the communications unit.

Embodiment 54. The method apparatus to embodiment 53, wherein the wireless sensor tag is configured to transmit an output NFC signal, wherein the output NFC signal includes the first food product ID number of the plurality of food product ID numbers.

Embodiment 55. The apparatus according to embodiment 46, wherein the wireless sensor tag is configured to configure itself to implement certain configuration parameters, based on the food product ID number of the plurality of food product ID numbers the wireless sensor tag is associated with after programming.

Embodiment 56. The apparatus according to embodiment 46, wherein the wireless sensor tag is NFC-enabled to receive an input NFC signal via the communications unit, and wherein the wireless sensor tag is wireless communication enabled with respect to at least one wireless communications protocol other than NFC to receive an input wireless communication with respect to the at least one wireless communications protocol other than NFC via the communications unit.

Embodiment 57. The apparatus according to embodiment 53, further comprising:

an NFC-enabled device, wherein the NFC-enabled device is enabled to transmit the input NFC data signal to the wireless sensor tag, wherein the NFC-enabled device comprises an internal memory, wherein the plurality of food product ID numbers are stored in the internal memory, wherein the NFC-enabled device is configured to transmit the input NFC data signal to the wireless sensor tag via the NFC-enabled device, wherein the input NFC data signal transmitted to the wireless sensor tag includes the first food product ID number of the plurality of food product ID numbers, wherein the wireless sensor tag is configured to receive the input NFC data signal when the wireless sensor tag is in range of the NFC-enabled device, wherein the at least one memory is configured to store the the food product ID number of the plurality of food product ID numbers included in the input NFC data signal received by the wireless sensor tag; and wherein the wireless sensor tag is configured to be positioned in range of the NFC-enabled device, such that the wireless sensor tag receives the input NFC data signal transmitted by the NFC-enabled device.

Embodiment 58. The apparatus according to embodiment 46, wherein the wireless sensor tag is a wireless temperature sensor tag.

Embodiment 59. The apparatus according to embodiment 58, wherein the wireless sensor tag is configured to be positioned with respect to the first food product of the plurality of food products such that the wireless temperature sensor tag is:
(i) in direct contact with first food product of the plurality of food products; or
(ii) in sufficient proximity to the first food product of the plurality of food products to measure temperatures that accurately reflect the temperature of the first food product of the plurality of food products being monitored.

Embodiment 60. The apparatus according to embodiment 46, wherein the wireless sensor tag is configured to be positioned with respect to the first food product such that the sensor unit collects sensor data with respect to the first food product, while the first food product is at a first location, such that the sensor unit collects sensor data with respect to the first food product, wherein the wireless sensor tag is configured to be transported, along with the first food product to be monitored, with the wireless sensor tag, from the first location to a second location, such that the wireless sensor tag collects sensor data with respect to the first food product during transportation; and wherein the wireless sensor tag is configured to, upon the first food product to be monitored, along with the wireless sensor tag, reaching the second location, establish communication with the wireless sensor tag and transferring the sensor data stored in the at least one memory, wherein the sensor data stored in the at least one memory was collected during transportation.

Embodiment 61. The apparatus according to embodiment 60, wherein the first location is a grower or a processor, and wherein the second location is a food service operator or retailer.

Embodiment 62. The apparatus according to embodiment 46, wherein the wireless sensor tag is a wireless temperature sensor tag, wherein the sensor data stored in the at least one memory comprises:
(i) a temperature of the first food product at certain time intervals;
(ii) a temperature of the first food product at certain times; or (iii) a temperature of the first food product at on a desired time schedule.

Embodiment 63. The apparatus according to embodiment 62,
wherein the sensor data stored in the at least one memory comprises the temperature of the first food product at thirty minute time intervals.

Embodiment 64. The apparatus according to embodiment 46,
wherein the wireless sensor tag is configured to be positioned with respect to the first food product such that the sensor unit collects sensor data with respect to the first food product, at a first time, such that the sensor unit collects sensor data with respect to the first food product,
wherein the wireless sensor tag is configured to be positioned, at a second time after the first time, and establish communication with the wireless sensor tag and transferring the sensor data stored in the at least one memory,
wherein the sensor data stored in the at least one memory was collected between the first time and the second time.

Embodiment 65. The apparatus according to embodiment 46,
wherein the first food product is a first food item or ingredient.

Embodiment 66. The apparatus according to embodiment 46,
wherein the wireless sensor tag is NFC-enabled to transmit an output NFC signal to the NFC-enabled device.

Embodiment 67. The apparatus according to embodiment 57,
wherein the at least one wireless communication protocol other than NFC includes one or more wireless communication protocols selected from the group consisting of:
Low-Energy Bluetooth (BLE)™, and cellular.

Embodiment 68. The apparatus according to embodiment 57,
wherein the NFC-enabled device is a sticker.

Embodiment 69. The apparatus according to embodiment 57,
wherein the NFC-enabled device is a card.

Embodiment 70. The apparatus according to embodiment 57,
wherein the NFC-enabled device is a fob.

Embodiment 71. The apparatus according to embodiment 57,
wherein the NFC-enabled device is a sheet containing multiple food items or ingredients.

Embodiment 72. The apparatus according to embodiment 46,
wherein the display is a low-power LCD display.

73. The apparatus according to embodiment 72,
wherein the low-power LCD display is selected from the group consisting of:
an electronic paper (e-paper) display, a bi-stable liquid crystal display, and a reflective LCD display.

Embodiment 74. The apparatus according to embodiment 46,
wherein the display is a segmented alphanumeric display.

Embodiment 75. The apparatus according to embodiment 47,
wherein parameters with respect to which the control unit controls the sensor unit, based on the food product of the plurality of food products the wireless sensor tag is associated with, are stored in the at least one memory.

Embodiment 76. The method according to embodiment 25,
wherein the configuration parameters change based on one or more of the following:
a location of the food product the wireless sensor tag is associated with; and
the food product the wireless sensor tag is associated with, and
wherein the configuration parameters include one or more of the following:
a low temperature threshold,
a low temperature exposure time interval,
a high temperature threshold,
a high temperature exposure time interval,
such that one or more alerts are generated when:
the temperature of the food product the wireless sensor tag is associated with is below the low temperature threshold;
the temperature of the food product the wireless sensor tag is associated with is below the low temperature threshold for a period of time longer than or equal to the low temperature exposure time interval,
the temperature of the food product the wireless sensor tag is associated with is above the high temperature threshold,
the temperature of the food product the wireless sensor tag is associated with is above the high temperature threshold for a period of time longer than or equal to the high temperature exposure time interval, and
a communication interval, wherein the communication interval is how often an output signal is transmitted by the wireless sensor tag.

Embodiment 77. The method according to embodiment 76,
wherein the wireless sensor tag indicates the low temperature threshold and the high temperature threshold on the display and/or via an LED.

Embodiment 78. The apparatus according to embodiment 55,
wherein the configuration parameters change based on one or more of the following:
a location of the food product the wireless sensor tag is associated with; and
the food product the wireless sensor tag is associated with, and
wherein the configuration parameters include one or more of the following:
a low temperature threshold,
a low temperature exposure time interval,
a high temperature threshold,
a high temperature exposure time interval,
such that one or more alerts are generated when:
the temperature of the food product the wireless sensor tag is associated with is below the low temperature threshold;
the temperature of the food product the wireless sensor tag is associated with is below the low temperature threshold for a period of time longer than or equal to the low temperature exposure time interval,
the temperature of the food product the wireless sensor tag is associated with is above the high temperature threshold,
the temperature of the food product the wireless sensor tag is associated with is above the high temperature threshold for a period of time longer than or equal to the high temperature exposure time interval, and
a communication interval, wherein the communication interval is how often an output signal is transmitted by the wireless sensor tag.

Embodiment 79. The apparatus according to embodiment 78, wherein the wireless sensor tag indicates the low temperature threshold and the high temperature threshold on the display and/or via an LED.

Aspects of the invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and nonvolatile media, transitory and non-transitory, transient and non-transient media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile disks (DVD), holographic media or other optical disk storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

REFERENCE NUMBERS

1—LED
2—Low power display
3—Buttons
4—Water proof housing with food grade material
5—First digit assigned to configuration setting ID
6—Last 3 digits assigned to food ingredient ID list.
7—Activation button
8—Number counting button
9—Turn on/off button
10—Alert signal
11—Low battery indicator
12—Digits that can display the product ID and the current temperature
13—Temperature unit indication
14—Digit measurement
15—Sensor unit/units, such as temperature, humidity, light etc.
16—Control unit such as a microprocessor
17—Memory unit
18—Wireless communication unit such as BL, BLE, Wi-Fi, Zigbee, etc
19—Antenna of the wireless communication unit
20—Clock unit
21—Display driver unit
22—Low power display
23—Other user interface components such as LED and buttons
24—Battery
25—Wireless NFC-enabled card
26—Wireless temperature sensor tag
27—Depiction of sensor data
28—Reader
29—Product to be monitored
30—NFC-enabled sticker
31—Card holder
32—Grower or processor
33—Food service operator
34—Retailer
35—Food ingredient ID list 36—Transportation
37—Transfer of sensor data
38—Sensor unit(s), such as temperature, humidity, and/or light
39—Control unit such as a microprocessor
40—Memory unit
41—Wireless communication unit such as BL, BLE, Wi-Fi, and/or Zigbee
42—Antenna of the wireless communication unit
43—Clock unit
44—NFC reader
45—NFC antenna
46—Other user interface components such as LED and buttons
47—Battery
48—Passive NFC IC
49A—Module that includes wireless communication unit 18, control unit 16, memory unit 17, clock 20, and antenna 19
49B—Module that includes wireless communication unit 41, control unit 39, memory unit 40, clock unit 43, and antenna 42
50—Passive NFC-enabled card
51—Active NFC-enabled card

The invention claimed is:

1. A method for monitoring a food product using a wireless sensor tag, comprising:
providing a wireless sensor tag,
wherein the wireless sensor tag comprises:
a display;
a sensor unit;
at least one memory,
wherein the at least one memory is configured to store sensor data collected by the sensor unit;
a wireless communication unit,
wherein the wireless communication unit is configured to transmit sensor data collected by the sensor unit and stored in the at least one memory,
wherein the wireless sensor tag is configured to be associated with a food product of a plurality of food products upon being programmed via a corresponding food product ID number of a corresponding plurality of food product ID numbers,
wherein the display is configured to show the food product ID number of the plurality of food product ID numbers the wireless sensor tag is associated with after programming;
programming the wireless sensor tag with a first food product of the plurality of food products,
showing the first food product ID number of the plurality of food product ID numbers the wireless sensor tag is associated with after programming;
positioning the wireless sensor tag with respect to the first food product of the plurality of food products such that the sensor unit collects sensor data with respect to the first food product of the plurality of food products and stores the sensor data with respect to the first food product of the plurality of food products in the at least one memory; and
transmitting the sensor data with respect to the first food product of the plurality of food products stored in the at least one memory,
wherein positioning the wireless sensor tag with respect to the first food product such that the sensor unit collects sensor data with respect to the first food product comprises positioning the wireless sensor tag with respect to the first food product, at a first time, such that the sensor unit collects sensor data with respect to the first food product,
at a second time after the first time, establishing communication with the wireless sensor tag and transferring the sensor data stored in the at least one memory,
wherein the sensor data stored in the at least one memory was collected between the first time and the second time.

2. The method according to claim 1,
wherein the wireless sensor tag further comprises:
a control unit,
wherein the control unit controls the sensor unit based on the food product of the plurality of food products the wireless sensor tag is associated with.

3. The method according to claim 2,
wherein the controls unit interconnects with the sensor unit, the at least one memory, the communication unit, and the display, so as to send and/or receive one or more signals to and/or from the sensor unit, the at least one memory, the communication unit, and the display.

4. The method according to claim 2,
wherein parameters with respect to which the control unit controls the sensor unit, based on the food product of the plurality of food products the wireless sensor tag is associated with, are stored in the at least one memory.

5. The method according to claim 1,
wherein the wireless sensor tag comprises at least one button for a user to enter the food product ID number of the plurality of food product ID numbers.

6. The method according to claim 5, further comprising:
providing the user a list of the plurality of food products,
wherein each food product of the plurality of food products on the list is assigned the corresponding food product ID number of the corresponding plurality of food product ID numbers.

7. The method according to claim 1,
wherein the at least one memory is configured to store the first food product ID number of the plurality of food product ID numbers the wireless sensor tag is associated with after programming.

8. The method according to claim 1,
wherein wireless sensor tag is configured to:
store at least a part of the food product ID number of the plurality of food product ID numbers the wireless sensor tag is associated with after programming in the at least one memory; or
store at least a part of the food product ID number of the plurality of food product ID numbers the wireless sensor tag is associated with after programming in a data packet shared with a receiver of the communications unit during each periodic communication interval.

9. The method according to claim 1,
wherein the wireless sensor tag is NFC-enabled to receive an input NFC signal via the communications unit.

10. The method according to claim 9, further comprising:
transmitting an output NFC signal,
wherein the output NFC signal includes the first food product ID number of the plurality of food product ID numbers.

11. The method according to claim 1,
wherein the wireless sensor tag is configured to configure itself to implement certain configuration parameters, based on the food product ID number of the plurality of food product ID numbers the wireless sensor tag is associated with after programming.

12. The method according to claim 11,
wherein the configuration parameters change based on one or more of the following:
   a location of the food product the wireless sensor tag is associated with; and
   the food product the wireless sensor tag is associated with, and
wherein the configuration parameters include one or more of the following:
   a low temperature threshold;
   a low temperature exposure time interval;
   a high temperature threshold; and
   a high temperature exposure time interval,
such that one or more alerts are generated when:
   the temperature of the food product the wireless sensor tag is associated with is below the low temperature threshold;
   the temperature of the food product the wireless sensor tag is associated with is below the low temperature threshold for a period of time longer than or equal to the low temperature exposure time interval;
   the temperature of the food product the wireless sensor tag is associated with is above the high temperature threshold; or
   the temperature of the food product the wireless sensor tag is associated with is above the high temperature threshold for a period of time longer than or equal to the high temperature exposure time interval, and
   a communication interval, wherein the communication interval is how often an output signal is transmitted by the wireless sensor tag.

13. The method according to claim 12,
wherein the wireless sensor tag indicates the low temperature threshold and the high temperature threshold on the display and/or via an LED.

14. The method according to claim 1,
wherein the wireless sensor tag is NFC-enabled to receive an input NFC signal via the communications unit, and
wherein the wireless sensor tag is wireless communication enabled with respect to at least one wireless communications protocol other than NFC to receive an input wireless communication with respect to the at least one wireless communications protocol other than NFC via the communications unit.

15. The method according to claim 1,
wherein the wireless sensor tag is a wireless temperature sensor tag,
wherein the sensor data stored in the at least one memory comprises:
   (i) a temperature of the first food product at certain time intervals;
   (ii) a temperature of the first food product at certain times; or
   (iii) a temperature of the first food product at on a desired time schedule.

16. The method according to claim 15,
wherein the sensor data stored in the at least one memory comprises the temperature of the first food product at thirty minute time intervals.

17. The method according to claim 1,
wherein the first food product is a first food item or ingredient.

18. The method according to claim 1,
wherein the wireless sensor tag is NFC-enabled to transmit an output NFC signal to the NFC-enabled device.

19. The method according to claim 1,
wherein the display is a low-power LCD display.

20. The method according to claim 19,
wherein the low-power LCD display is selected from the group consisting of:
   an electronic paper (e-paper) display, a bi-stable liquid crystal display, and a reflective LCD display.

21. The method according to claim 1,
wherein the display is a segmented alphanumeric display.

22. A method for monitoring a food product using a wireless sensor tag, comprising:
   providing a wireless sensor tag,
   wherein the wireless sensor tag comprises:
      a display;
      a sensor unit;
      at least one memory,
         wherein the at least one memory is configured to store sensor data collected by the sensor unit;
      a wireless communication unit,
         wherein the wireless communication unit is configured to transmit sensor data collected by the sensor unit and stored in the at least one memory,
   wherein the wireless sensor tag is configured to be associated with a food product of a plurality of food products upon being programmed via a corresponding food product ID number of a corresponding plurality of food product ID numbers,
   wherein the display is configured to show the food product ID number of the plurality of food product ID numbers the wireless sensor tag is associated with after programming;
   programming the wireless sensor tag with a first food product of the plurality of food products,
   showing the first food product ID number of the plurality of food product ID numbers the wireless sensor tag is associated with after programming;
   positioning the wireless sensor tag with respect to the first food product of the plurality of food products such that the sensor unit collects sensor data with respect to the first food product of the plurality of food products and stores the sensor data with respect to the first food product of the plurality of food products in the at least one memory; and
   transmitting the sensor data with respect to the first food product of the plurality of food products stored in the at least one memory,
   wherein the wireless sensor tag is NFC-enabled to receive an input NFC signal via the communications unit,
   providing an NFC-enabled device,
   wherein the NFC-enabled device is enabled to transmit the input NFC data signal to the wireless sensor tag,
   wherein the NFC-enabled device comprises an internal memory,
   wherein the plurality of food product ID numbers are stored in the internal memory,
   transmitting the input NFC data signal to the wireless sensor tag via the NFC-enabled device,
   wherein the input NFC data signal transmitted to the wireless sensor tag includes the the first food product ID number of the plurality of food product ID numbers,
   wherein the wireless sensor tag is configured to receive the input NFC data signal when the wireless sensor tag is in range of the NFC-enabled device,
   wherein the at least one memory is configured to store the food product ID number of the plurality of food product ID numbers included in the input NFC data signal received by the wireless sensor tag; and positioning the wireless sensor tag in range of the NFC-enabled device, such that the wireless sensor tag receives the input NFC data signal transmitted by the NFC-enabled device.

23. The method according to claim 1,
wherein providing a wireless sensor tag comprises providing a wireless temperature sensor tag.

24. The method according to claim 23,
wherein positioning the wireless sensor tag with respect to the first food product of the plurality of food products comprises positioning the wireless sensor tag such that the wireless temperature sensor tag is:
   (i) in direct contact with first food product of the plurality of food products; or
   (ii) in sufficient proximity to the first food product of the plurality of food products to measure temperatures that accurately reflect the temperature of the first food product of the plurality of food products being monitored.

25. The method according to claim 22,
wherein the at least one wireless communication protocol other than NFC includes one or more wireless communication protocols selected from the group consisting of:
   Low-Energy Bluetooth (BLE)™, WI-FI, and cellular.

26. The method according to claim 22,
wherein the NFC-enabled device is a sticker.

27. The method according to claim 22,
wherein the NFC-enabled device is a card.

28. The method according to claim 22,
wherein the NFC-enabled device is a fob.

29. The method according to claim 22,
wherein the NFC-enabled device is a sheet containing multiple food items or ingredients.

30. A method for monitoring a food product using a wireless sensor tag, comprising:
providing a wireless sensor tag,
wherein the wireless sensor tag comprises:
   a display;
   a sensor unit;
   at least one memory,
      wherein the at least one memory is configured to store sensor data collected by the sensor unit;
   a wireless communication unit,
      wherein the wireless communication unit is configured to transmit sensor data collected by the sensor unit and stored in the at least one memory,
   wherein the wireless sensor tag is configured to be associated with a food product of a plurality of food products upon being programmed via a corresponding food product ID number of a corresponding plurality of food product ID numbers,
   wherein the display is configured to show the food product ID number of the plurality of food product ID numbers the wireless sensor tag is associated with after programming;
programming the wireless sensor tag with a first food product of the plurality of food products,
showing the first food product ID number of the plurality of food product ID numbers the wireless sensor tag is associated with after programming;
positioning the wireless sensor tag with respect to the first food product of the plurality of food products such that the sensor unit collects sensor data with respect to the first food product of the plurality of food products and stores the sensor data with respect to the first food product of the plurality of food products in the at least one memory; and
transmitting the sensor data with respect to the first food product of the plurality of food products stored in the at least one memory,
wherein positioning the wireless sensor tag with respect to the first food product such that the sensor unit collects sensor data with respect to the first food product comprises positioning the wireless sensor tag with respect to the first food product, while the first food product is at a first location, such that the sensor unit collects sensor data with respect to the first food product,
further comprising:
transporting the first food product to be monitored, along with the wireless sensor tag, from the first location to a second location, such that the wireless sensor tag collects sensor data with respect to the first food product during transportation; and
upon the first food product to be monitored, along with the wireless sensor tag, reaching the second location, establishing communication with the wireless sensor tag and transferring the sensor data stored in the at least one memory,
wherein the sensor data stored in the at least one memory was collected during transportation.

31. The method according to claim 30,
wherein the first location is a grower or a processor, and wherein the second location is a food service operator or retailer.

32. An apparatus for monitoring a food product using a wireless sensor tag, comprising:
a wireless sensor tag,
wherein the wireless sensor tag comprises:
   a display;
   a sensor unit;
   at least one memory,
      wherein the at least one memory is configured to store sensor data collected by the sensor unit;
   a wireless communication unit,
      wherein the wireless communication unit is configured to transmit sensor data collected by the sensor unit and stored in the at least one memory,
   wherein the wireless sensor tag is configured to be associated with a food product of a plurality of food products upon being programmed via a corresponding food product ID number of a corresponding plurality of food product ID numbers,
   wherein the display is configured to show the food product ID number of the plurality of food product ID numbers the wireless sensor tag is associated with after programming;
   wherein the wireless sensor tag is configured to be programmed with a first food product of the plurality of food products,
   wherein the display is configured to show the first food product ID number of the plurality of food product ID numbers the wireless sensor tag is associated with after programming;
   wherein the wireless sensor tag is configured such that, when positioned with respect to the first food product of the plurality of food products, the sensor unit collects sensor data with respect to the first food product of the plurality of food products and stores the sensor data with respect to the first food product of the plurality of food products in the at least one memory;

wherein the wireless sensor tag is configured to transmit the sensor data with respect to the first food product of the plurality of food products stored in the at least one memory, wherein the wireless sensor tag is configured to be positioned with respect to the first food product such that the sensor unit collects sensor data with respect to the first food product, at a first time, such that the sensor unit collects sensor data with respect to the first food product, wherein the wireless sensor tag is configured to be positioned, at a second time after the first time, and establish communication with the wireless sensor tag and transferring the sensor data stored in the at least one memory, wherein the sensor data stored in the at least one memory was collected between the first time and the second time.

\* \* \* \* \*